(12) United States Patent
Heller

(10) Patent No.: US 8,607,032 B2
(45) Date of Patent: *Dec. 10, 2013

(54) DIAGNOSE INSTRUCTION FOR SERIALIZING PROCESSING

(75) Inventor: Lisa C. Heller, Rhinebeck, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/459,167

(22) Filed: Apr. 28, 2012

(65) Prior Publication Data

US 2012/0216195 A1 Aug. 23, 2012

Related U.S. Application Data

(63) Continuation of application No. 12/822,886, filed on Jun. 24, 2010.

(51) Int. Cl.
G06F 9/00 (2006.01)

(52) U.S. Cl.
USPC .......................................................... 712/220

(58) Field of Classification Search
None
See application file for complete search history.

(56) References Cited

U.S. PATENT DOCUMENTS

| | | | |
|---|---|---|---|
| 5,551,013 A | 8/1996 | Beausolei et al. | |
| 5,574,873 A | 11/1996 | Davidian et al. | |
| 5,790,825 A | 8/1998 | Traut | |
| 5,809,551 A | 9/1998 | Blandy | |
| 5,944,841 A | 8/1999 | Christie | |
| 6,009,261 A | 12/1999 | Scalzi et al. | |
| 6,308,255 B1 | 10/2001 | Gorishek et al. | |
| 6,463,582 B1 | 10/2002 | Lethin et al. | |
| 6,493,741 B1 | 12/2002 | Emer et al. | |
| 6,996,698 B2 | 2/2006 | Slegel et al. | |
| 7,020,761 B2 | 3/2006 | Slegel et al. | |
| 7,284,100 B2 | 10/2007 | Slegel et al. | |
| 7,530,067 B2 | 5/2009 | Slegel et al. | |
| 2004/0064618 A1 | 4/2004 | Farrell et al. | |
| 2004/0073905 A1 | 4/2004 | Emer et al. | |
| 2005/0245248 A1 | 11/2005 | Rajaram | |
| 2007/0055480 A1 | 3/2007 | Endoh et al. | |
| 2007/0186075 A1* | 8/2007 | Slegel et al. | 711/207 |
| 2009/0216928 A1 | 8/2009 | Heller et al. | |
| 2009/0216929 A1 | 8/2009 | Heller et al. | |
| 2009/0217264 A1 | 8/2009 | Heller et al. | |
| 2009/0217269 A1 | 8/2009 | Heller et al. | |
| 2009/0240908 A1 | 9/2009 | Slegel et al. | |
| 2011/0320661 A1 | 12/2011 | Heller | |

OTHER PUBLICATIONS

"z/Architecture Principles of Operation," IBM Publication No. SA22-7832-07, Feb. 2009, 8th Edition.

(Continued)

*Primary Examiner* — Jacob A Petranek
(74) *Attorney, Agent, or Firm* — John E. Campbell; Blanche E. Schiller, Esq.; Heslin Rothenberg Farley & Mesiti P.C.

(57) ABSTRACT

A system serialization capability is provided to facilitate processing in those environments that allow multiple processors to update the same resources. The system serialization capability is used to facilitate processing in a multi-processing environment in which guests and hosts use locks to provide serialization. The system serialization capability includes a diagnose instruction which is issued after the host acquires a lock, eliminating the need for the guest to acquire the lock.

13 Claims, 24 Drawing Sheets

(56) References Cited

OTHER PUBLICATIONS

International Search Report and Written Opinion for PCT/EP2010/067038 dated Jun. 15, 2011, pp. 1-10.
"z/Architecture—Principles of Operation, Chapter 10", IBM Publication No. SA22783205, Apr. 2007, pp. 10-1 thru 10-138.
Wells, Philip M. et al., "Serializing Instructions in System-Intensive Workloads: Amdahl's Law Strikes Again,", IEEE 14th International Symposium on High Performance Computer Architecture, Feb. 2008, pp. 264-275.
Office Action for U.S. Appl. No. 12/822,886 dated Mar. 19, 2013, pp. 1-10.

\* cited by examiner

DIAGNOSE INSTRUCTION FOR SERIALIZING PROCESSING

This application is a continuation of U.S. Ser. No. 12/822,886, entitled "DIAGNOSE INSTRUCTION FOR SERIALIZING PROCESSING," filed Jun. 24, 2010, which is hereby incorporated herein by reference in its entirety.

BACKGROUND

This invention relates, in general, to processing within a computing environment, and in particular, to serializing processing in a multi-processing computing environment.

Typically, in machines based on the z/Architecture® offered by International Business Machines Corporation, Armonk, N.Y., when a program (referred to as a guest in this context) is running under LPAR (logical partition mode) or z/VM®, guest instructions are executed by the hardware or firmware. This execution of an instruction often includes translation of operand addresses and fetching or storing of data from or to those addresses. While each instruction is being executed, the hardware guarantees that any invalidate page table entry (IPTE), dynamic address translation (DAT) table entry (IDTE), or compare and swap and purge (CSP/G) requests that come in from another processor and may invalidate the translation associated with that instruction wait until the instruction is complete. Similarly, no translation or storage access is made which may be applicable to a pending IPTE, IDTE or CSP/G until that IPTE, IDTE or CSP/G operation is complete.

There are instances where the LPAR or z/VM® hypervisor needs to emulate an instruction on behalf of the guest. In order to do this, the hypervisor may need to manually translate (i.e., perform a multi-step translation unknown to the hardware) the operand addresses associated with the instruction and make subsequent storage accesses based on those translations. In order to guarantee that no conflict occurs between an IPTE, IDTE, CSP/G issued by one processor in the guest multi-processing (MP) configuration and an instruction emulation being performed by the hypervisor on behalf of another processor in that same configuration, a single interlock is used. This lock, referred to as the IPTE Interlock, resides in a System Control Area (SCA), which is a control block that is shared between all MP guests for a particular virtual configuration. The hypervisor would hold the lock during an instruction emulation and the firmware would hold the lock when executing an IPTE, IDTE or CSP/G.

To improve performance, the single lock has been split into a two-part shared lock. One part of the IPTE Interlock is a shared lock maintained by the hypervisor or host and is held by the hypervisor during emulation of an instruction; the other portion is maintained by firmware on behalf of the guest and is held while executing an IPTE, IDTE, or CSP/G. Each lock is a count of host or guest processors who currently hold the lock. To ensure consistency in the lock, the hypervisor or firmware increments the appropriate lock count (host or guest, respectively) using a compare and swap (e.g., Compare and Swap (CSG) instruction) only if the other lock (guest or host, respectively) is not held. If the host determines that the IPTE Interlock is held by the guest, it waits until the lock is available before proceeding with the instruction emulation; if the guest detects that the host lock is held, it intercepts (with an instruction interception) back to the host.

On a large single-image system, the overhead to perform the compare and swap may become substantial. When a processor is executing an IPTE, IDTE, or CSP/G, it performs a broadcast fast-quiesce operation to notify all the processors in the system of the invalidation. Only one fast-quiesce operation is allowed in the system for any one partition. If a processor issues a fast-quiesce operation and the quiesce hardware is already busy with another request, this request is rejected. On this large, single image when running a workload that is high in quiesce requests, rejections are frequent. In order to ensure proper execution, the IPTE Interlock is obtained before issuing the fast-quiesce request and then is released after the operation, even when the request is rejected. Each compare and swap causes the associated cache-line to be fetched exclusive and on a large, multi-node, single-image machine the system-wide penalty for this can be considerable.

BRIEF SUMMARY

The shortcomings of the prior art are overcome and advantages are provided through the provision of a method of executing a diagnose instruction to serialize processing. The method includes, for instance, obtaining a machine instruction for execution, the machine instruction being defined for computer execution according to a computer architecture, the machine instruction including, for instance, an opcode field identifying a diagnose instruction; a subcode field identifying a first location, the contents of which include a subcode used in execution of the diagnose instruction; a base field identifying a second location, the contents of which are added to the contents of a displacement field to obtain an operation code extension used to identify that the diagnose instruction is being used to serialize processing; and executing the machine instruction as indicated by the operation code extension, the executing including based on the subcode being a pre-defined value: initiating quiescing of processors of the computing environment; determining the processors are quiesced; and based on the processors being quiesced, completing execution of the diagnose instruction.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
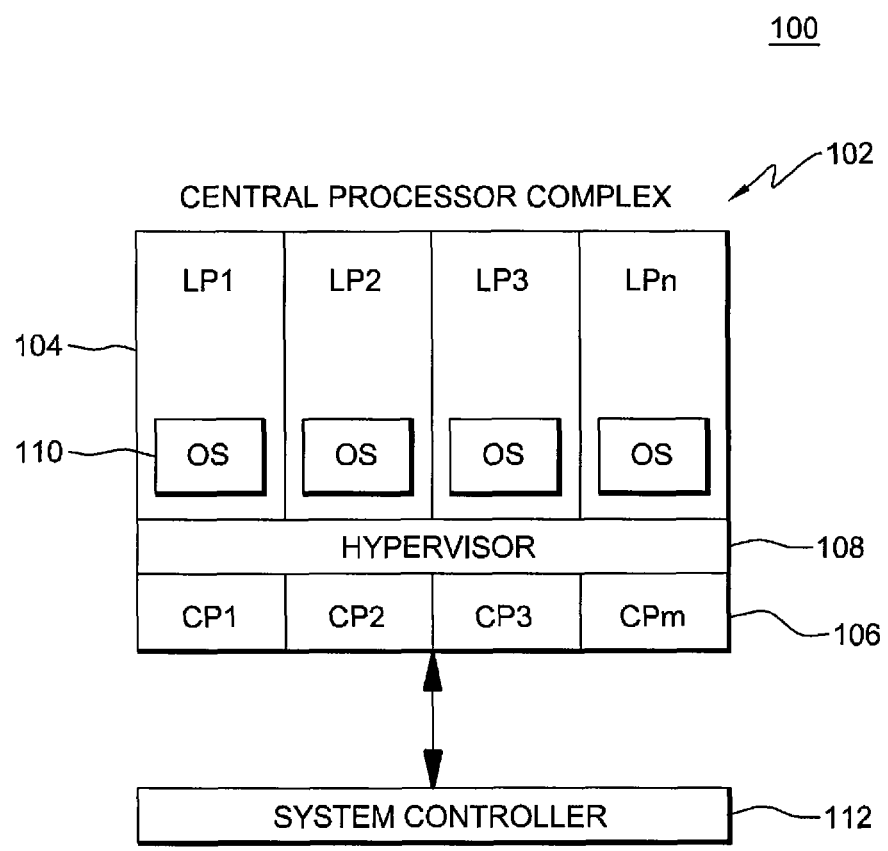
FIG. 1 depicts one embodiment of a computing environment to incorporate and use one or more aspects of the present invention.

In accordance with an aspect of the present invention, a system serialization capability is provided to facilitate processing in those environments that allow multiple processors to update the same resources (e.g., address translation tables). Particularly, in one example, the system serialization capability is used to facilitate processing in a multi-processing environment in which guests and hosts use locks to provide serialization. As an example, a system serialization function is employed, after the host acquires a lock (e.g., an IPTE Interlock), eliminating the need for the guest to acquire the lock at all. Although this may increase the overhead seen by the host associated with acquiring the lock, which is relatively rare, it removes the lock acquisition entirely in the more common case of acquisition of the IPTE Interlock by the guest. This eliminates nearly all, if not all, contention for the IPTE Interlock.

One embodiment of a computing environment 100 incorporating and using one or more aspects of the present invention is described with reference to FIG. 1. Computing environment 100 is based, for instance, on the z/Architecture® offered by International Business Machines Corporation, Armonk, N.Y. The z/Architecture® is described in an IBM® publication entitled, "z/Architecture® Principles of Operation," IBM Publication No. SA22-7832-07, February 2009, 8$^{th}$ Edition, which is hereby incorporated herein by reference in its entirety. In one example, a computing environment based on the z/Architecture® includes a System z® server, offered by International Business Machines Corporation, Armonk, N.Y. IBM®, z/Architecture®, z/VM® and System z® are registered trademarks of International Business Machines Corporation, Armonk, N.Y. Other names used herein may be registered trademarks or trademarks of International Business Machines Corporation or other companies.

As one example, computing environment 100 includes a central processor complex (CPC) 102 coupled to a system controller 112. Central processor complex 102 includes, for instance, one or more partitions 104 (e.g., logical partitions LP1-LPn), one or more central processors 106 (e.g., CP1-CPm), and a hypervisor 108 (e.g., a logical partition manager), each of which is described below.

Each logical partition 104 is capable of functioning as a separate system. That is, each logical partition 104 can be independently reset, initially loaded with an operating system 110, if desired, and operate with different programs. An operating system 110 or application program running in a logical partition 104 appears to have access to a full and complete system, but in reality, only a portion of it is available. A combination of hardware and Licensed Internal Code (commonly referred to as microcode or firmware) keeps a program in one logical partition 104 from interfering with a program in a different logical partition 104. This allows several different logical partitions 104 to operate on a single or multiple physical processors in a time sliced manner. In this particular example, each logical partition 104 has a resident operating system (OS) 110, which may differ for one or more logical partitions 104. In one embodiment, operating system 110 is the z/OS® operating system, offered by International Business Machines Corporation, Armonk, N.Y. z/OS® is a registered trademark of International Business Machines Corporation, Armonk, N.Y.

Central processors 106 are physical processor resources that are allocated to the logical partitions 104. For instance, a logical partition 104 includes one or more logical processors, each of which represents all or a share of physical processor resources 106 allocated to the partition. The logical processors of a particular partition 104 may be either dedicated to the partition, so that the underlying processor resource is reserved for that partition; or shared with another partition, so that the underlying processor resource is potentially available to another partition.

Logical partitions 104 are managed by hypervisor 108 implemented by firmware running on processors 106. Logical partitions 104 and hypervisor 108 each comprise one or more programs residing in respective portions of central storage associated with the central processors 106. One example of hypervisor 108 is the Processor Resource/Systems Manager™ (PR/SM), offered by International Business Machines Corporation, Armonk, N.Y.

As used herein, firmware includes, e.g., the microcode, firmware and/or macrocode of the processor. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware.

System controller 112, which is coupled to the central processor complex, includes centralized logic responsible for arbitrating between different processors issuing requests. For instance, when system controller 112 receives a quiesce request, it determines that the requestor is the initiating processor for that request and that the other processors are receiving processors; it broadcasts messages; and otherwise, handles requests. This is described in further detail below.

Another example of a computing environment to incorporate and use one or more aspects of the present invention is described with reference to FIG. 2. In this example, computing environment 200 includes a central processor complex (CPC) 202 coupled to a system controller 240. Central processor complex 202 includes, for instance, one or more partitions 204 (e.g., logical partitions LP1-LPn), one or more central processors 230 (e.g., CP1-CPm), and a first-level hypervisor1 208 (e.g., a logical partition manager), as described above.

In this particular example, logical partition 1 (LP1) 220 has a resident operating system 222 and logical partition 2 (LP2) 224 runs a second-level hypervisor2 210, which in turns creates virtual machines (e.g., VM1-VMx) 212, each of which runs its own resident operating system 214. Any number of the logical partitions may run a second-level hypervisor. In one embodiment, hypervisor2 210 is the z/VM® hypervisor, offered by International Business Machines Corporation, Armonk, N.Y. z/VM® is a registered trademark of International Business Machines, Armonk, N.Y.

In addition, the resident operating systems running in the various logical partitions may differ, and when running under a second-level hypervisor, the resident operating systems within a single partition may also differ. In one embodiment, operating system 222 is the z/OS® operating system offered by International Business Machines Corporation, Armonk, N.Y.; and operating systems 214 are Linux.

Similar to central processors 106, central processors 230 are physical processor resources that are allocated to the logical partitions. For instance, a logical partition 1 (LP1) 220 includes one or more logical processors, each of which represents all or a share of physical processor resources 230 allocated to the partition. The logical processors of a particular partition may be either dedicated to the partition, so that the underlying processor resource is reserved for that partition; or shared with another partition, so that the underlying processor resource is potentially available to another partition. When a second-level hypervisor2 210 is running in a logical partition (e.g., LP2 224), it can provide the same virtualization of resources provided by hypervisor1 208 to logical partitions 204 to the operating systems 214 running in the virtual machines within that partition. As at the first level, each virtual machine may include multiple virtual processors. The term "virtual CPU" is used herein to refer to a logical or virtual processor.

Logical partitions 204 are managed by hypervisors 208 and 210. Logical partitions 204 and hypervisor 208 (implemented by firmware) each comprise one or more programs residing in respective portions of central storage associated with the central processors. One example of hypervisor 208 is the Processor Resource/Systems Manager™ (PR/SM), offered by International Business Machines Corporation, Armonk, N.Y.

System controller 240, which is coupled to the central processor complex, includes centralized logic responsible for arbitrating between different processors issuing requests. For instance, when system controller 240 receives a quiesce request, it determines that the requestor is the initiating processor for that request and that the other processors are receiving processors; it broadcasts messages; and otherwise, handles requests.

Figure 3:
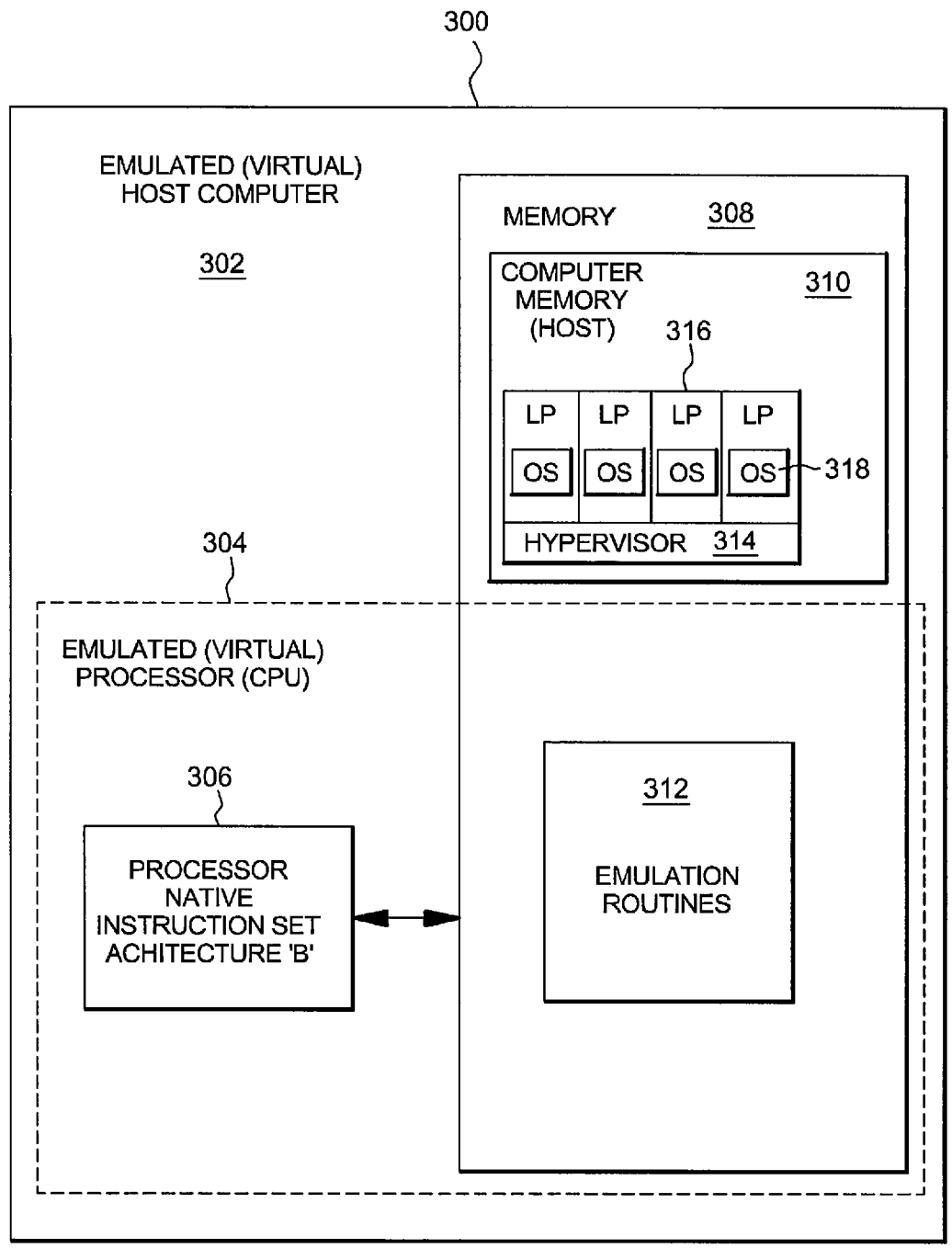
FIG. 3 depicts one embodiment of an emulated computing environment to incorporate and use one or more aspects of the present invention.

Another example of a computing environment to incorporate one or more aspects of the present invention is depicted in FIG. 3. In this example, an emulated host computer system 300 is provided that emulates a host computer system 302 of a host architecture. In emulated host computer system 300, a host processor (CPU) 304 is an emulated host processor (or virtual host processor) and includes an emulation processor 306 having a different native instruction set architecture than used by the processors of host computer 302. Emulated host computer system 300 has memory 308 accessible to emulation processor 306. In the example embodiment, memory 308 is partitioned into a host computer memory 310 portion and an emulation routines 312 portion. Host computer memory 310 is available to programs of emulated host computer 300 according to host computer architecture, and may include both a host or hypervisor 314 and one or more hypervisors running logical partitions (LPs) 316. Each logical partition may execute an operating system 318.

Emulation processor 306 executes native instructions of an architected instruction set of an architecture other than that of the emulated processor 304. The native instructions are obtained from emulation routines memory 312, and may access a host instruction for execution from a program in host computer memory 310 by employing one or more instruction(s) obtained in a sequence & access/decode routine, which may decode the host instruction(s) accessed to determine a native instruction execution routine for emulating the function of the host instruction accessed. One such host instruction may be, for example, a Start Interpretive Execution (SIE) instruction, by which the host seeks to execute a program in a virtual machine. The emulation routines 312 may include support for this instruction, and for executing a sequence of guest instructions in accordance with the definition of this SIE instruction.

Other facilities that are defined for the architecture of host computer system 302 may be emulated by architected facilities routines, including such facilities as general purpose registers, control registers, dynamic address translation, and I/O subsystem support and processor cache, for example. The emulation routines may also take advantage of functions available in emulation processor 304 (such as general registers and dynamic translation of virtual addresses) to improve performance of the emulation routines. Special hardware and offload engines may also be provided to assist processor 306 in emulating the function of host computer 302.

Figure 4:
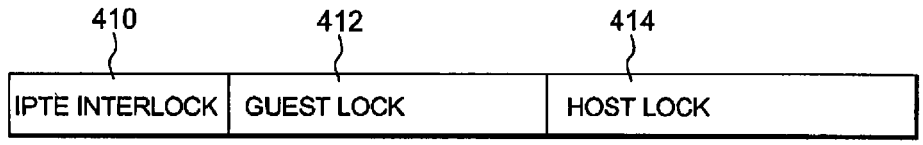
FIG. 4 depicts one embodiment of an IPTE Interlock used to serialize guest translation table usage and updates between the guest and the host, in accordance with an aspect of the present invention.

To serialize processing in a computing environment, in one embodiment, a shared IPTE Interlock (also referred to herein as a shared lock, shared IPTE lock or lock) is used. This lock is employed to, for instance, serialize the use of guest Dynamic Address Translation (DAT) and Access Register Translation (ART) tables by the hypervisor and updates to those tables made by firmware on behalf of a guest. One example of a shared IPTE Interlock is depicted in FIG. 4. A shared IPTE Interlock 410 is held by the host hypervisor while it is translating one or more operands using guest DAT or ART tables or by firmware when it is updating translation tables on behalf of a guest IPTE, IDTE, CSP/G request.

Responsive to the hypervisor acquiring the lock, it increments a host IPTE lock count 414. Similarly, previous to an aspect of the present invention, responsive to the firmware acquiring the lock, it increments a guest IPTE lock count 412. However, in accordance with an aspect of the present invention, the guest IPTE lock is no longer used.

One embodiment of a conventional technique for maintaining the shared IPTE lock by the hypervisor during a manual guest DAT or ART translation is described with reference to FIGS. 5A-5B. The hypervisor typically performs this translation when it is emulating an instruction on behalf of the guest in order to access one or more storage operands. The translation is referred to herein as manual, since it is a multi-step process that is not known to the hardware. Therefore, the hardware does not serialize the processing for the hypervisor.

Figure 5A:
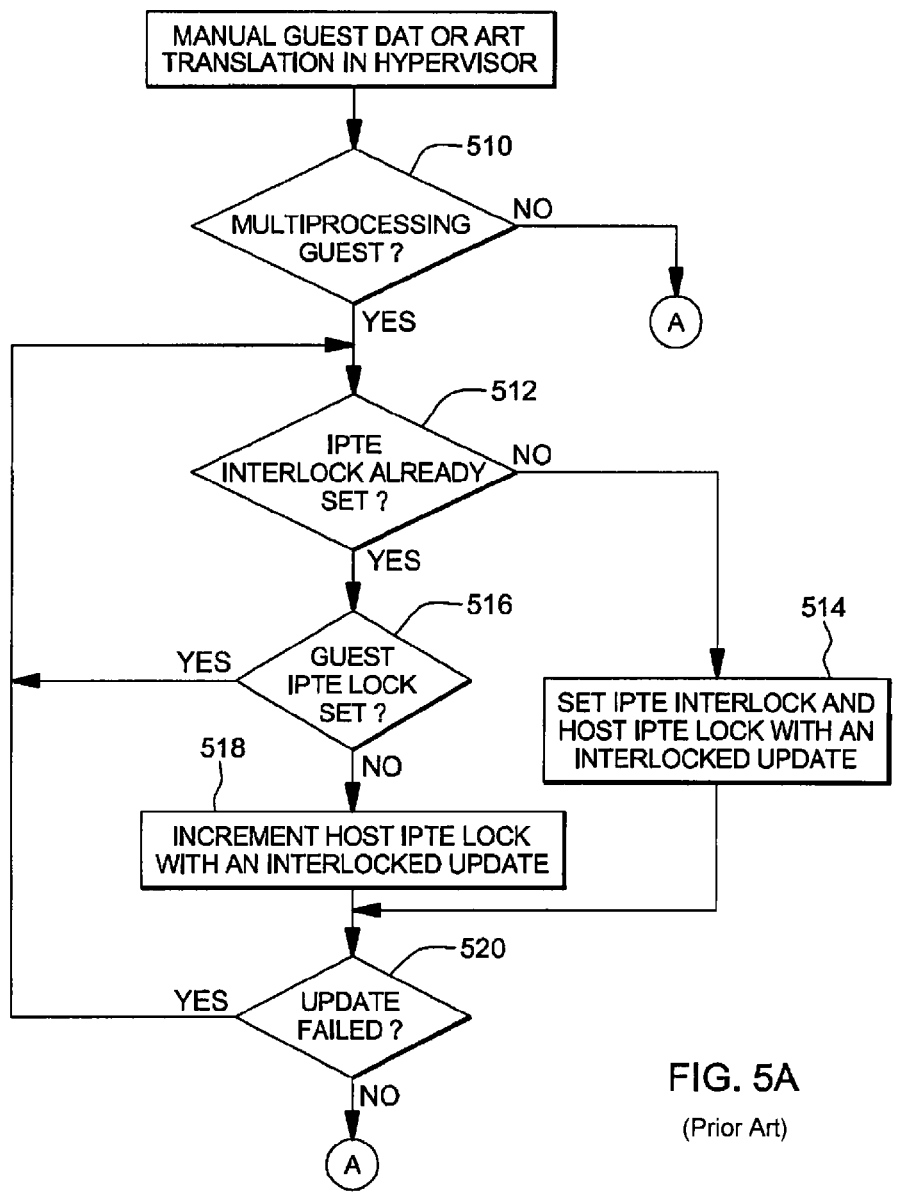
FIGS. 5A-5B depict one embodiment of the logic associated with conventional hypervisor processing of the IPTE Interlock.
Figure 5B:
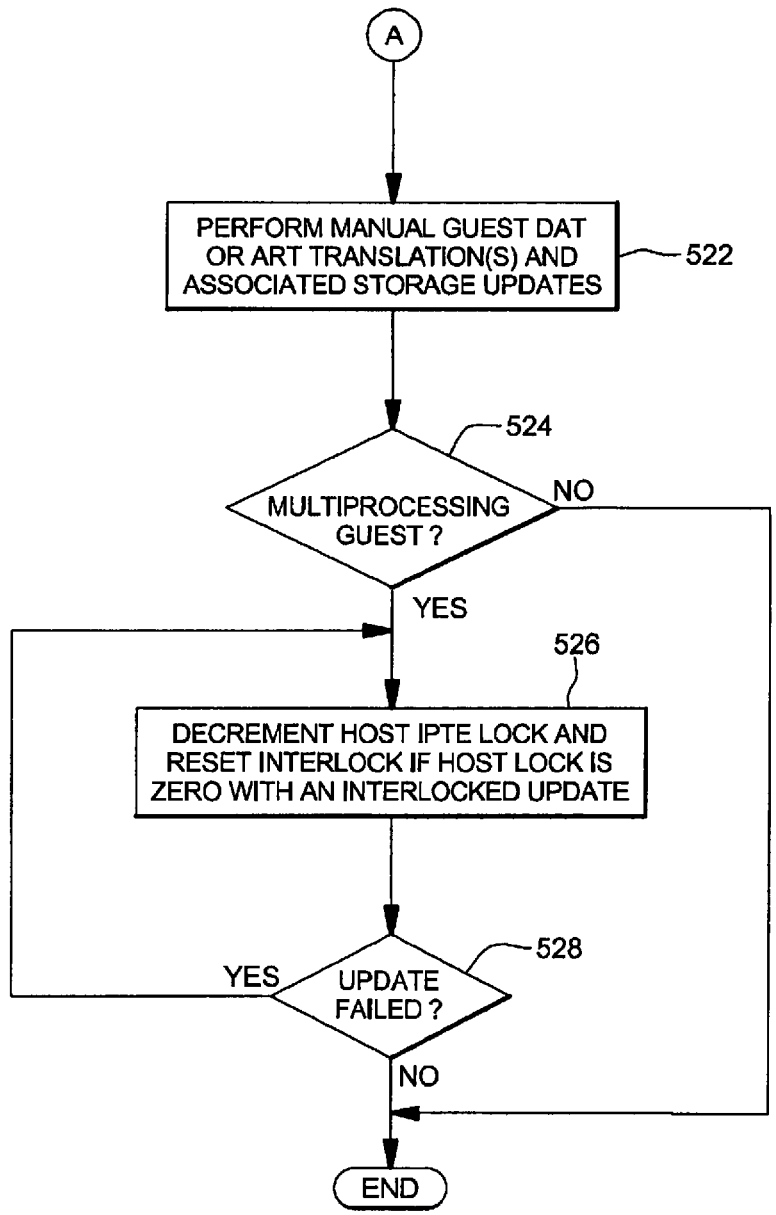

As depicted in FIG. 5A, before beginning the actual translation, the hypervisor checks if the guest to whom the address translation applies is a multi-processing (MP) guest, i.e. more than one virtual processor in the configuration, INQUIRY 510. If the guest is a uni-processor guest, i.e. only one virtual processor in the configuration, the hypervisor can perform the manual translations, STEP 522 (FIG. 5B) without setting the IPTE Interlock. This is because the IPTE Interlock is used to manage the case where one guest processor would be executing an instruction being emulated by the hypervisor and the other issues an IPTE, IDTE, or CSP/G to update a translation table. In a uni-processor guest, if an instruction is being emulated, there is no other processor to issue the instruction to update the translation tables.

Thereafter, a determination is once again made as to whether this is a multi-processing guest, INQUIRY 524. Since in this case it is not, processing is complete.

Returning to FIG. 5A, if the applicable guest is running in a multi-processing environment, INQUIRY 510, then the hypervisor first determines if the IPTE Interlock is already held, INQUIRY 512. If it is not, then the hypervisor can obtain the interlock, STEP 514. This is accomplished by using, for instance, an interlocked update, such as a compare and swap operation (e.g., a Compare and Swap (CSG) in the z/Architecture®). The compare and swap compares the data from the original fetch with the current data only makes the update if the data has not changed. The hardware guarantees that this check and update are atomic, i.e. no other processor has changed the lock in the meantime. The hypervisor sets the IPTE Interlock and increments the host IPTE lock count from, for instance, zero to one. If this interlocked update failed, INQUIRY 520, it returns to INQUIRY 512 and checks the interlock again.

If the IPTE Interlock is already held, INQUIRY 512, then the hypervisor checks if it is held by the guest, i.e. the guest count is non-zero, INQUIRY 516. If it is held by the guest, the hypervisor returns to refetch the interlock and check it again, INQUIRY 512. If the guest does not hold the interlock, INQUIRY 516, this means that the host hypervisor already owns the lock. The hypervisor attempts to increment the host lock count, STEP 518, and if this attempt fails, INQUIRY 520, it returns to INQUIRY 512 and checks the interlock again.

Responsive to the update to the host IPTE Interlock being successful, INQUIRY 520, then the hypervisor can proceed with the manual translation, STEP 522 (FIG. 5B) knowing that no translation tables will be modified during the operation.

Subsequent to the hypervisor completing the translations and associated storage updates, STEP 522, if the guest is an MP guest, INQUIRY 524, then the hypervisor releases its share of the IPTE Interlock with an interlocked updated, STEP 526. This is accomplished, in one example, by decrementing the host IPTE count and resetting the IPTE Interlock if the new count is zero, STEP 526. This update is repeated until it is successful, INQUIRY 528. Responsive to a successful update, the hypervisor is finished.

In addition to the host using the IPTE Interlock, the guest also uses it. One scenario in which the guest uses it is in execution of instructions that perform a quiesce operation. The term "quiesce" refers to the mechanisms used to force all processors in a multi-processor system (i.e., those processors that have access to the data structure (e.g., table) being updated) to stop their activity while one processor causes some change in the system state. One common implementation for the quiesce operation includes the following: 1) all the processors are quiesced (i.e., most normal processing operations are suspended); 2) any buffered entries which are dependent on the resource being updated are invalidated on those processors; 3) the common resource is updated by the quiesce initiator, and 4) finally, the quiesce is released and the processors continue their normal activity. This quiescing operation is used for, among other things, the execution of IPTE, IDTE, and most CSP instructions when the guest is running in a multi-processing environment. It is in these cases that the IPTE Interlock is set.

Figure 6A:
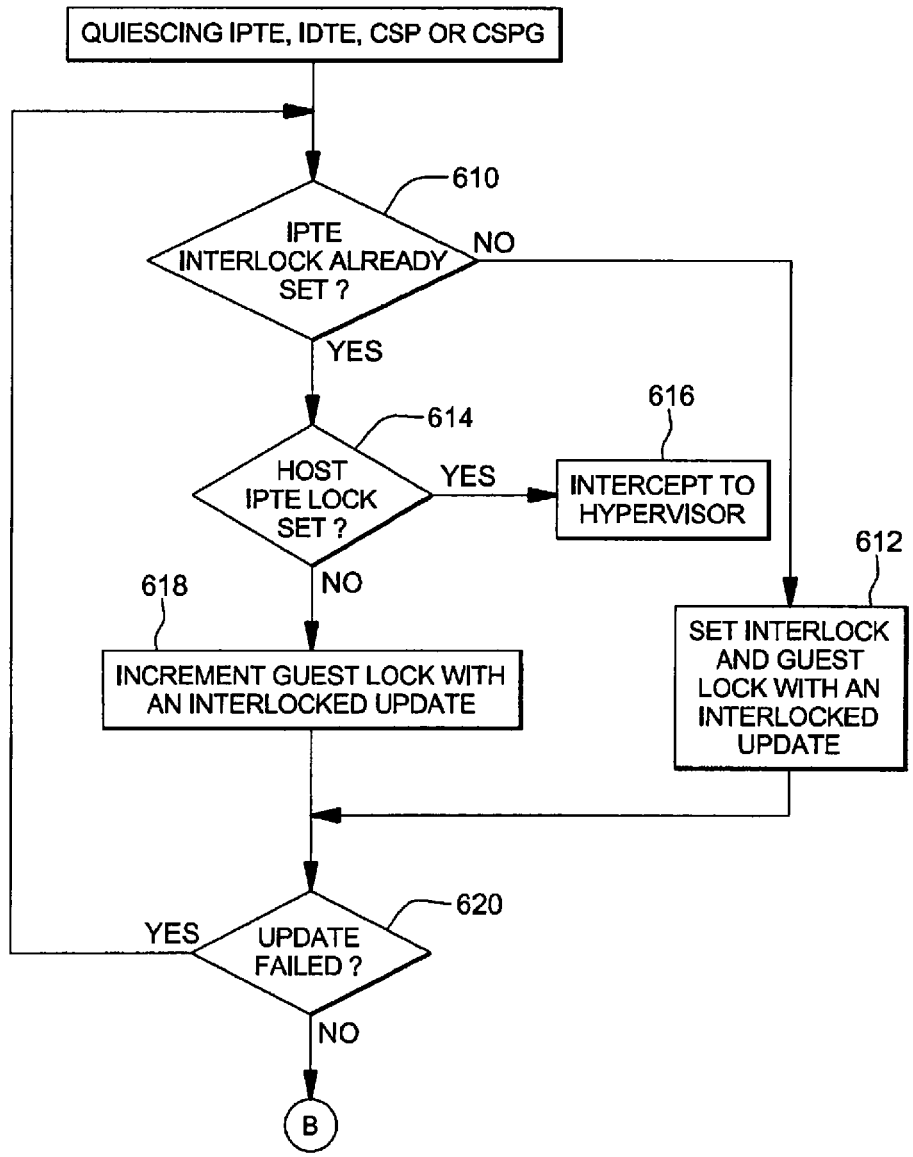
FIGS. 6A-6B depict one embodiment of the logic associated with conventional guest processing of the IPTE Interlock.
Figure 6B:
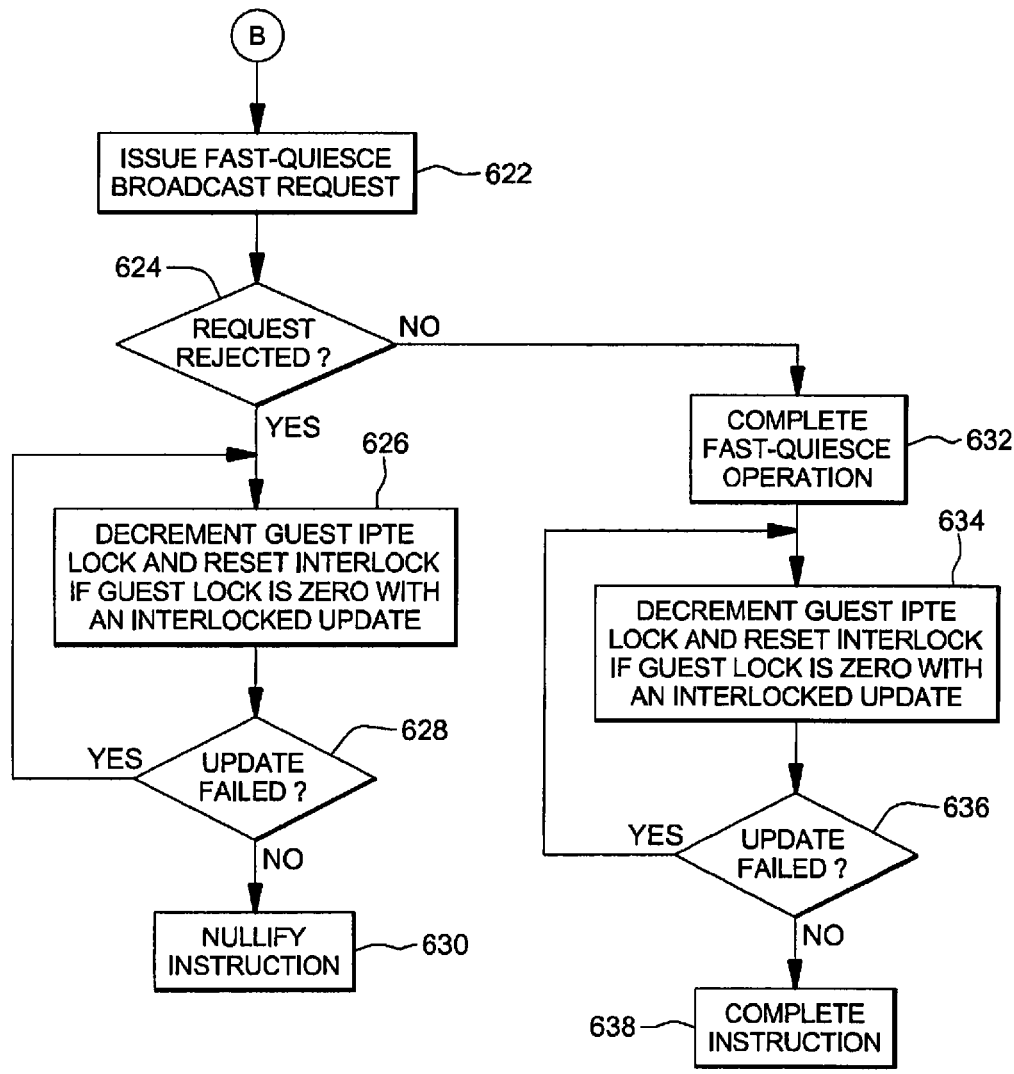

FIGS. 6A-6B depict one embodiment of a conventional guest implementation of the IPTE Interlock updates associated with the quiescing IPTE, IDTE, and CSP/G instructions in a guest multi-processing environment. Referring to FIG. 6A, the firmware first determines if the IPTE interlock is already held, INQUIRY 610. If it is not, then the firmware obtains the interlock, STEP 612. This is accomplished by using, for instance, an interlocked update using a compare and swap operation (e.g., Compare and Swap (CSG)). The compare and swap compares the data from the original fetch with the current data and only makes the update if the data has not changed. The hardware guarantees that this check and update are atomic, i.e. no other processor has changed the lock in the meantime. The firmware sets the IPTE Interlock and increments the guest IPTE lock count from, e.g., zero to one, STEP 612. If this interlocked update failed, INQUIRY 620, it returns to INQUIRY 610 and checks the interlock again.

If the IPTE interlock is already held, INQUIRY 610, then the firmware checks if it is held by the host, i.e. the host count is non-zero, INQUIRY 614. If it is held by the host, the firmware intercepts back to the hypervisor, STEP 616, with some indications of the type of interception and the instruction involved. Typically, in this case, the hypervisor redispatches the guest causing the guest code to start executing again at the IPTE-type (or quiesce type) instruction.

If the host does not hold the interlock, INQUIRY 614, this means that the guest (firmware) already owns the lock. The firmware then attempts to increment the guest lock count, STEP 618, and if this attempt fails, INQUIRY 620, it returns to INQUIRY 610 and checks the interlock again. Responsive to the update to the guest IPTE interlock being successful, INQUIRY 620, the firmware proceeds with a fast-quiesce operation, STEP 622 (FIG. 6B) knowing that no translation dependent on tables being updated by the instruction involved are being done by the hypervisor.

Figure 2:
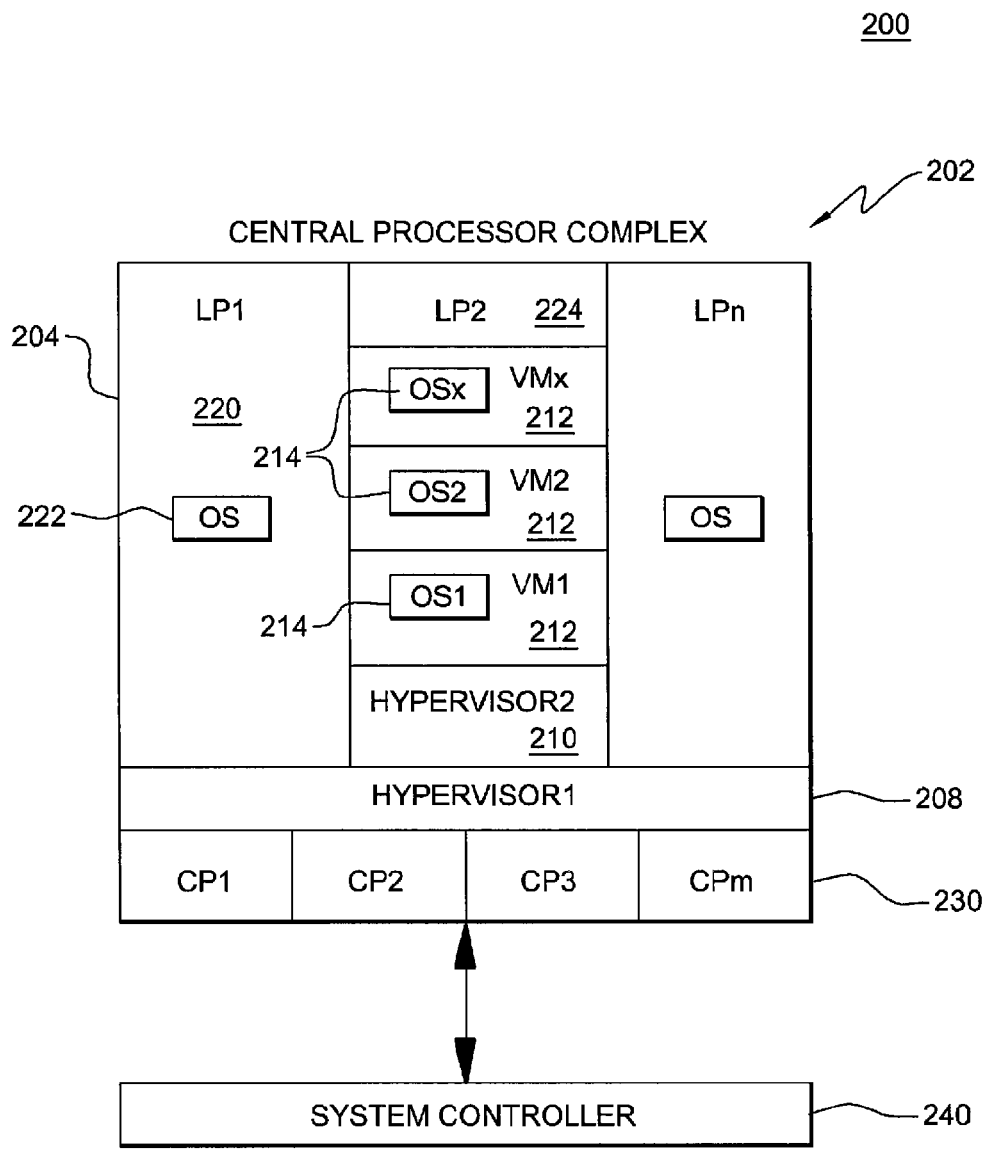
FIG. 2 depicts another embodiment of a computing environment to incorporate and use one or more aspects of the present invention.

Any fast-quiesce operation issued by the central processor (e.g., 106 or 230 in FIGS. 1 and 2, respectively) is to be serialized by the system controller (112 or 240 in FIGS. 1 and 2, respectively). This serialization includes tracking of the quiesce operation on all the different processors so, in order to guarantee proper serialization in the system, one fast-quiesce is allowed per partition or guest configuration at any one time.

If a fast-quiesce request is made and the associated hardware in the system controller is already busy with another request, this fast-quiesce request is rejected.

If the fast-quiesce request is rejected, INQUIRY 624, then the firmware resets its share of the guest IPTE Interlock, STEP 626. This is accomplished by using an interlocked update to decrement the guest IPTE count and resetting the IPTE Interlock if the new count is zero, STEP 626. This update is repeated until it is successful, INQUIRY 628.

Responsive to this interlocked update being completed successfully, the firmware nullifies the IPTE-type instruction so that it can be executed again, STEP 630. For instance, it backs up the instruction pointer to point back to the IPTE, IDTE, CSP/G, etc., so it will execute again. (Note: In one example, after a certain number of rejections, the firmware uses a different (conventional) quiesce mechanism, which guarantees the fast-quiesce request will complete.)

Returning to INQUIRY 624, if the fast-quiesce request is not rejected, then the firmware completes the fast-quiesce operation, STEP 632, which includes validating relevant buffered values in the processors and updating the appropriate translation table entry in storage. It then also resets its share of the IPTE Interlock, STEP 634, retrying as needed, INQUIRY 636, and when successful, completes the instruction (e.g., IPTE, IDTE, CSP/G), STEP 638.

In a large system, there may be many quiesce requests being made which can result in a large number of fast-quiesce rejections. Of course, the overall time required to complete any given fast-quiesce operation increases as the number of rejections it receives increases. The IPTE Interlock is to be set before issuing the fast-quiesce request in order to ensure proper coordination with the hypervisor. Each rejection requires the setting and resetting of the IPTE Interlock, thus increasing the contention for the IPTE Interlock. In a large single-image system, all the processors in the system are sharing the same interlock. As the number of processors in the system increases and the relative time to process quiesce operations increases in comparison with CPU time, the number of rejections increases as does the number of interlocked accesses to the IPTE Interlock. As a result, the amount of time spent trying to acquire the interlock becomes excessive.

In accordance with an aspect of the present invention, the setting of the guest IPTE lock is eliminated in the host implementation of maintaining the shared lock. This is described with reference to FIGS. 7A-7B. This implementation minimizes changes to the hypervisor, particularly with respect to recovery.

Figure 7A:
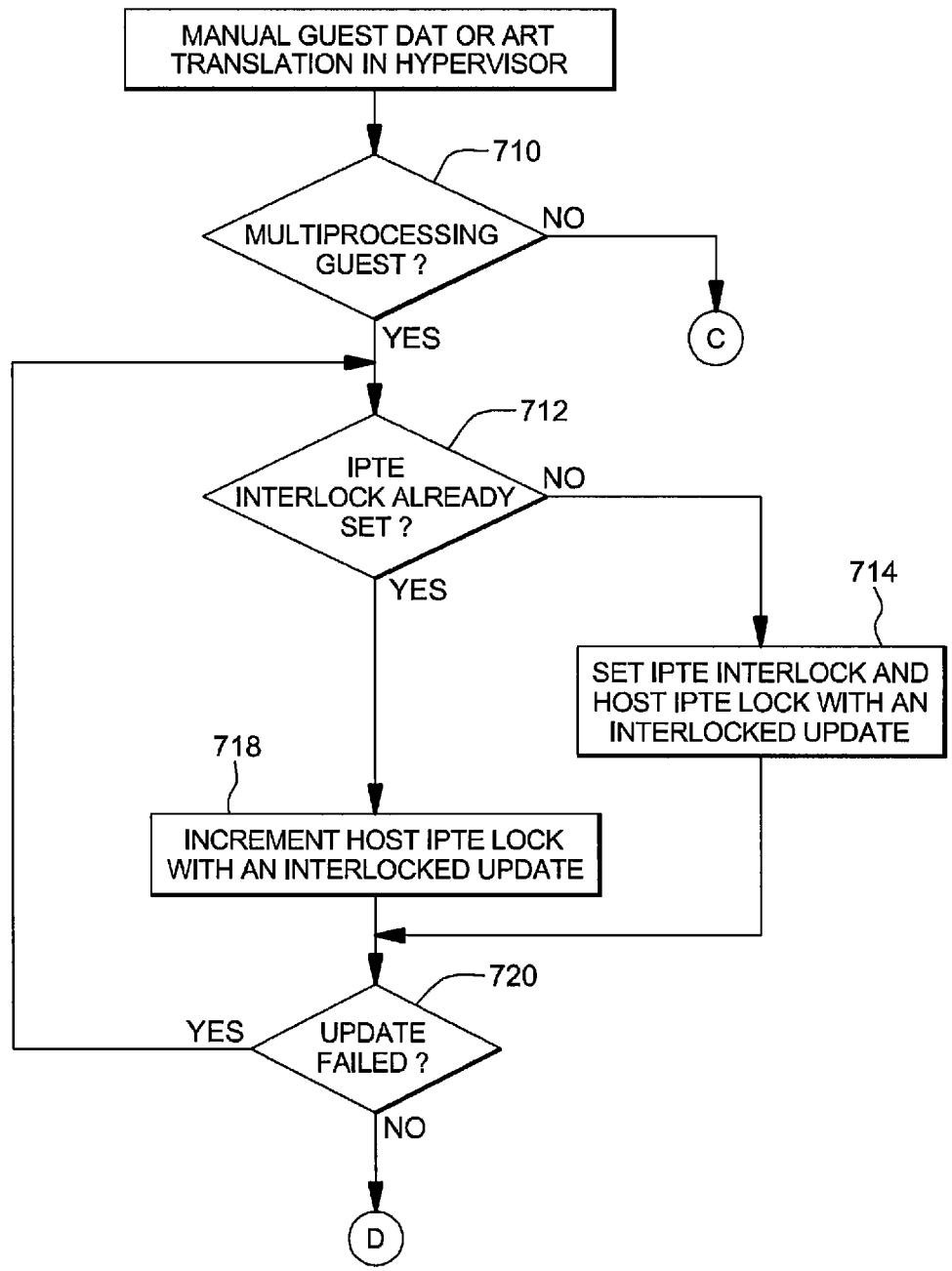
FIGS. 7A-7B depict one embodiment of the logic associated with hypervisor processing of an IPTE Interlock alternative, in accordance with an aspect of the present invention.

Referring initially to FIG. 7A, if the guest translation applies to a uni-processor (i.e., it is not a multi-processor) environment, INQUIRY 710, then it performs the manual guest DAT or ART translation(s) and associated storage updates, STEP 722 (FIG. 7B), and continues to end, STEP 730; same as with IPTE Interlock.

Returning to INQUIRY 710 (FIG. 7A), if, however, the guest is running in a multi-processing environment, it no longer needs to test the guest IPTE lock. The hypervisor still, however, increments the host lock. For instance, a determination is made as to whether the IPTE Interlock is already set, INQUIRY 712. If not, it is set, as well as the host IPTE lock with an interlocked update, STEP 714. If the IPTE Interlock is set, INQUIRY 712, then the host IPTE lock is incremented with an interlocked update. If, in either case, the update failed, INQUIRY 720, then it is retried.

In a further embodiment, in order to allow for the IPTE Interlock alternative to be disabled transparent to the hypervisor, the hypervisor may continue to test the guest IPTE lock, as described with reference to FIG. 5A. Since the host setting of the IPTE lock is relatively rare, the performance impact of this is minimal.

Figure 7B:
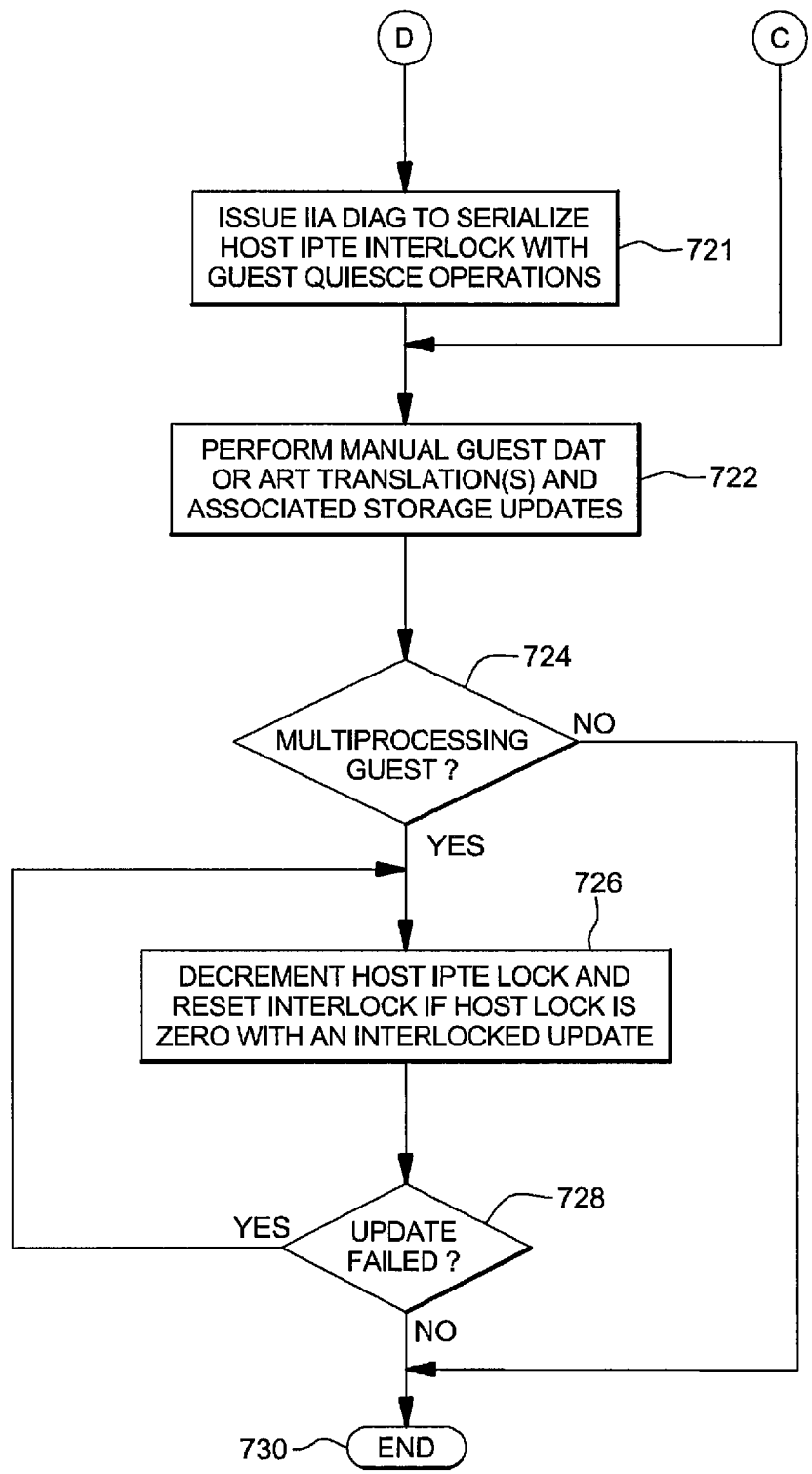

Responsive to setting the host IPTE lock, the hypervisor issues a Diagnose (DIAG) instruction, which causes a quiesce serialization in the hardware, STEP 721 (FIG. 7B). This quiesce serialization does two things. First, it guarantees that the host IPTE lock update is seen across the system, and second, it ensures that any pending guest quiesce operation has completed. Since the host IPTE lock is set, no new guest quiesce operation can begin. This instruction is described more fully below.

Subsequent to DIAG completing, the hypervisor continues with performing the manual guest ART or DAT translation(s) and the associated storage updates, as described above, STEP 722. A determination is then made as to whether this is multi-processing guest environment, INQUIRY 724. If so, the host IPTE lock is decremented and the interlock is reset, if the host lock is zero, STEP 726. This is accomplished by an interlocked update. If the update fails, INQUIRY 728, processing continues with STEP 726. Otherwise, or if this is not a multi-processing environment, processing completes, STEP 730.

One embodiment of the logic associated with the guest implementation of the IPTE Interlock Alternative of the quiescing IPTE, IDTE, and CSP/G instructions is described with reference to FIGS. 8A-8B. In this embodiment, although the firmware still examines the host portion of the IPTE lock, it no longer updates the guest IPTE lock.

Figure 8A:
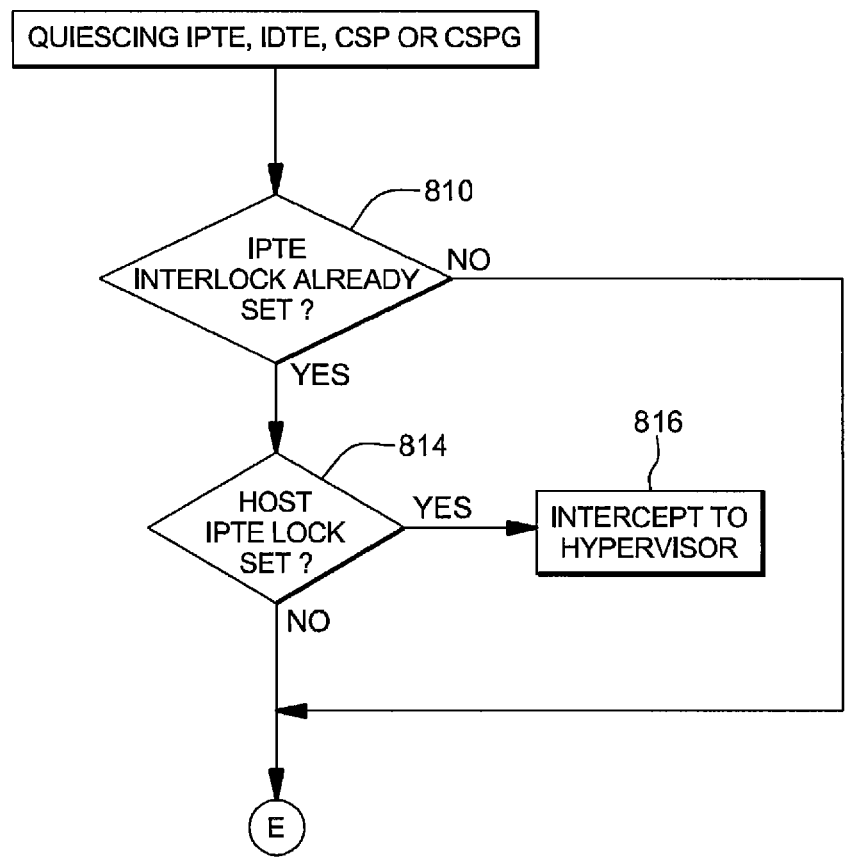
FIGS. 8A-8B depict one embodiment of the logic associated with guest processing of the IPTE Interlock alternative, in accordance with an aspect of the present invention.
Figure 8B:
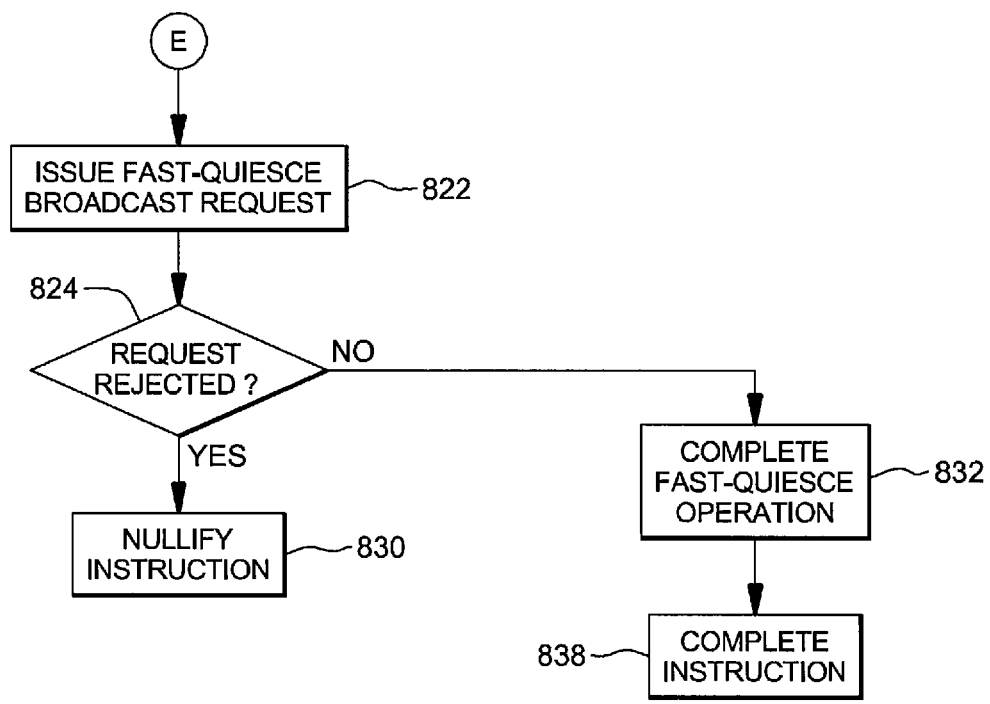

Referring to FIG. 8A, if the IPTE interlock is set, INQUIRY 810, implying that the host IPTE lock is set, INQUIRY 814, then the firmware presents an instruction interception for the quiescing instruction to the hypervisor, STEP 816. This prevents the quiescing operation from being performed while the hypervisor is performing a manual translation. The hypervisor (host), by issuing the DIAG instruction, has already guaranteed that no quiesce will be going on during the manual translation. This makes the setting of the guest lock not needed.

If the host IPTE lock is not set, INQUIRY 814, the firmware issues the fast-quiesce broadcast request, STEP 822 (FIG. 8B), and if the fast-quiesce request is rejected, INQUIRY 824, nullifies the instruction, STEP 830. If the request was accepted, INQUIRY 824, the firmware completes the fast-quiesce operation, STEP 832, and completes the instruction, STEP 838. In neither of these two cases, the update to the guest IPTE lock is needed, since the lock was not set.

Further details regarding the DIAG instruction are described with reference to FIGS. 9A-9C. The DIAG instruction provides a new-defined, system serialization. The hypervisor issues this instruction, which is executed by firmware, after setting the IPTE Interlock in the system control area, but before beginning any translation associated with the instruction interception.

Figure 9A:
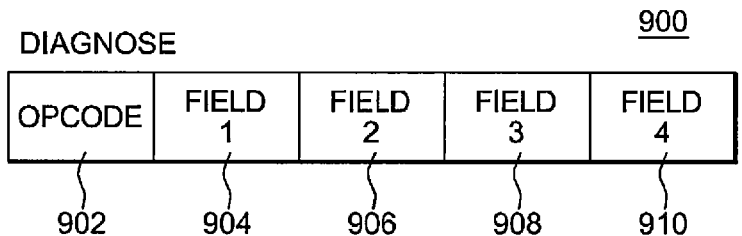
FIG. 9A depicts one embodiment of a Diagnose (DIAG) instruction used in accordance with an aspect of the present invention.

One embodiment of a DIAG (Diagnose) instruction is depicted in FIG. 9A. As shown, a Diagnose (also referred to herein as DIAG) instruction 900 includes, for instance, an opcode 902 indicating the DIAG instruction; a first field 904 (a.k.a., a control area field) specifying a location at which a system control area address is located; a second field 906 (a.k.a., a subcode field) specifying a location at which a subcode used in execution of DIAG is provided; a third field 908 (a.k.a., a base field) specifying a location that includes data to be added to the contents of a fourth field 910 (a.k.a., a displacement field) to be used as an operation code extension identifying, for instance, the DIAG for IPTE Interlock Alternative.

Examples of subcodes include the following:

When, for instance, subcode zero is specified, the system control area address and is ignored and no operation is performed.

When, for instance, subcode 2 is specified, the system control area address identifies a guest for whom translation is being performed, and execution of the diagnose is not completed on the CPU which executes it until all of the CPUs in the configuration have completed interpretation of in-process DAT synchronizing (DS) instructions (e.g., IPTE, IDTE, CSP/G) of the designated guests. Completion of the diagnose also ensures that while the host holds the IPTE interlock, any subsequent guest DS instruction recognizes an instruction interception.

One embodiment of the logic associated with the DIAG instruction is described with reference to FIGS. 9B-9C.

Figure 9B:
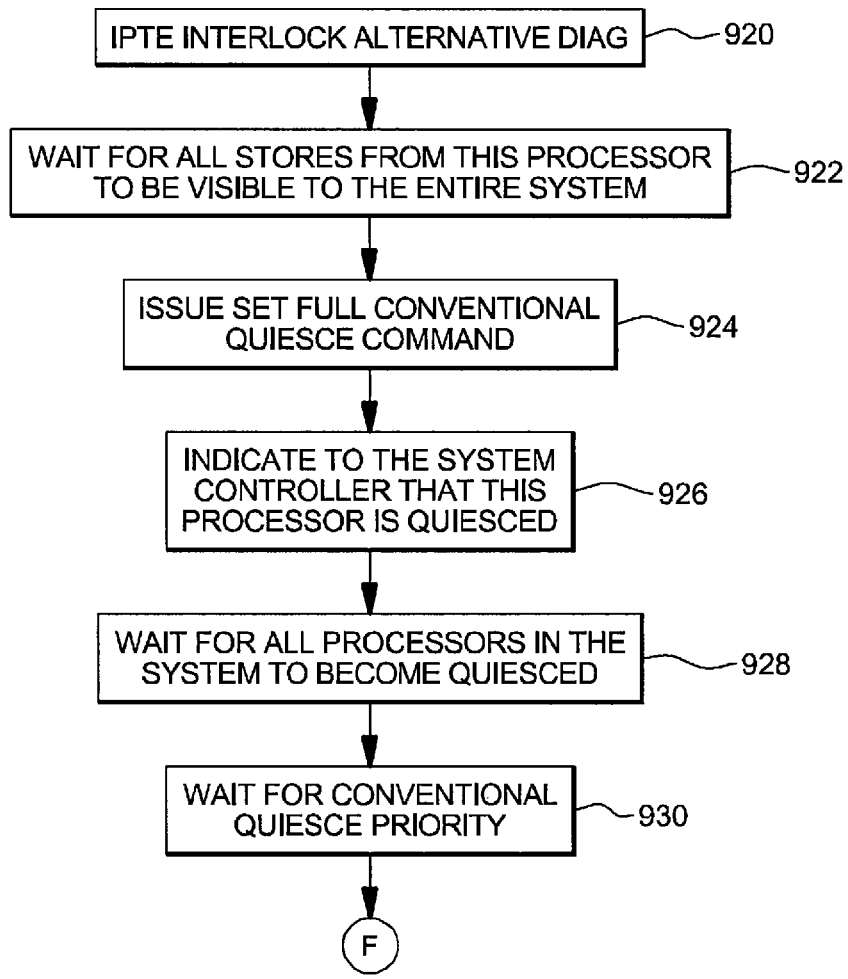
FIGS. 9B-9C depict one embodiment of the logic associated with the DIAG instruction used as part of the IPTE Interlock alternative, in accordance with an aspect of the present invention.
Figure 9C:
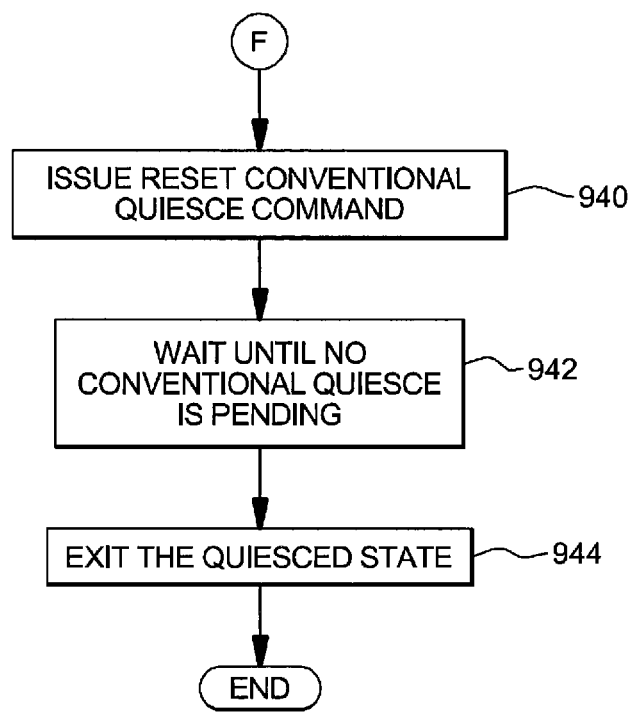

Referring to FIG. 9B, a DIAG instruction, implemented in firmware, is issued by the hypervisor, STEP 920. This instruction guarantees that all processors in the system (i.e., those processors that have access to the resource being updated) will observe the IPTE Interlock that was previously set by the hypervisor by waiting for any local pending stores to become visible to the system, STEP 922. That is, the processor waits until the local pending stores (including the host portion of the IPTE Interlock) have been written to a level of storage visible to all the processors. It also waits for completion of any IPTE, IDTE, CSP/G instruction pending in the system by issuing a full conventional quiesce mechanism, STEP 924. Firmware running on the central processor (e.g., 106 in FIG. 1) that issued the DIAG accomplishes this by issuing a broadcast Set Full Conventional Quiesce command to the system controller (e.g., 112 in FIG. 1). The system controller then broadcasts this command to all the processors in the system. This processing is further described below with reference to FIG. 10.

Responsive to being quiesced, the initiator of the DIAG also sets an I-am-quiesced indicator indicating that it too has entered the quiesced state, STEP 926, and waits for all processors to become quiesced, STEP 928. The system controller indicates to every processor that the system is quiesced once all the processors in the system have set the I-am-quiesced indicator. This guarantees that all IPTE, IDTE, and CSP/G instructions that may have been pending in the system have been completed. Since every processor has made their local stores visible to the entire system, it also guarantees that any future IPTE, IDTE, and CSP/G executed by the guest will be intercepted to the host, since the IPTE Interlock bit is set. This is the same as previously guaranteed by the IPTE Interlock, without the overhead of the guest compare and swap.

Responsive to the system being quiesced, STEP 928, the initiator of the DIAG waits for conventional quiesce priority, STEP 930. If there are multiple conventional quiesces pending in the system at one time, the hardware and firmware ensure that each processor takes a turn in receiving conventional quiesce priority. One this processor has priority, since it has already, via the conventional quiesce, completed its operation, it issues a Reset Conventional Quiesce command, STEP 940 (FIG. 9C). This reset command is again broadcast to all processors in the system and once all conventional quiesce initiators have reset their requests, there will be no quiesce requests pending.

Response to the conventional quiesce requests being reset, STEP 942, both the DIAG initiator and the receivers can exit the quiesced state, i.e. reset I-am-quiesced, STEPs 914, respectively. This completes processing.

Figure 10:
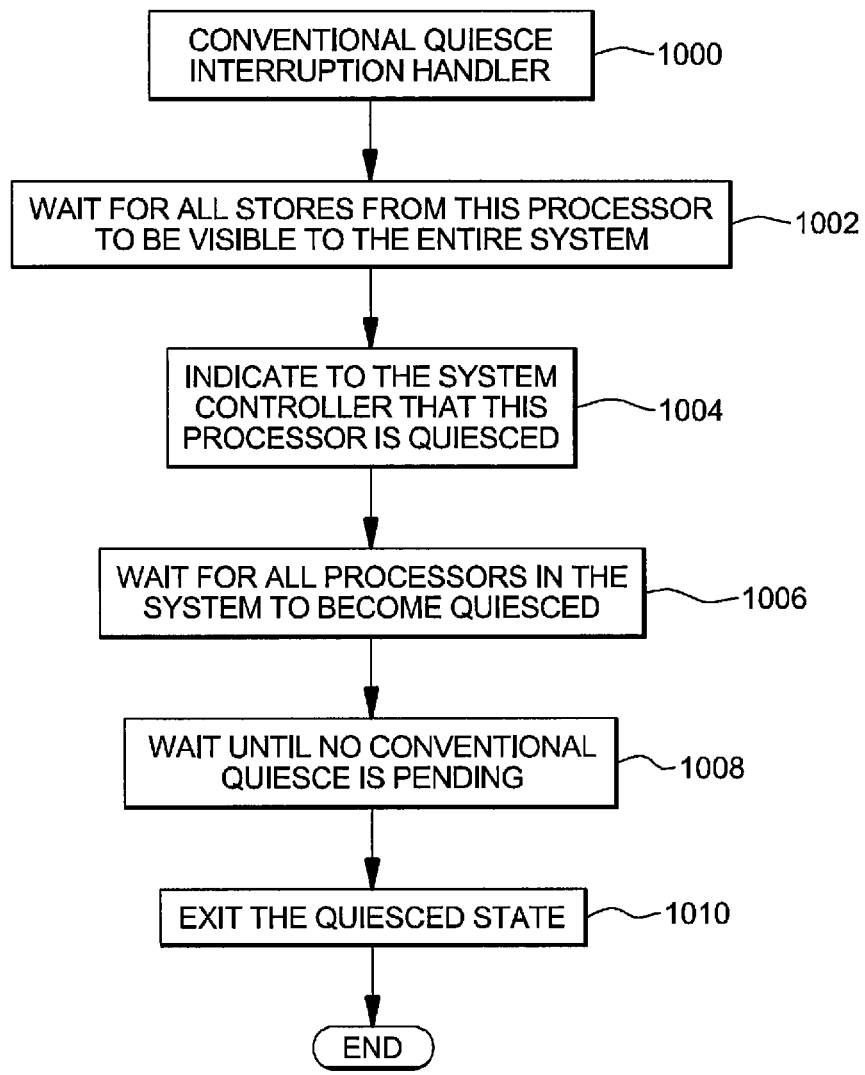
FIG. 10 depicts one embodiment of the logic associated with handling a quiesce issued by the DIAG instruction, in accordance with an aspect of the present invention.

Further details regarding the quiesce request are described with reference to FIG. 10. In response to issuing the Set Full Conventional Quiesce request, each processor in the system, when it reaches an interruptible point, suspends normal processing by entering the quiesce interruption firmware handler, STEP 1000. It then waits for all local pending stores to become visible to the system, STEP 1002. Responsive to this occurring, it sets an I-am-quiesced indicator, which indicates to the system controller that it has entered the quiesced state, STEP 1004, and waits for all processors in the system to reach the quiesced state, STEP 1006. The firmware waits until there is no conventional quiesce requests pending, STEP 1008, and then it exits the quiesced state (e.g., resets I-am quiesced), STEP 1010.

Further details regarding fast-quiesce and full conventional (total system) quiesce requests are described below.

Figure 11A:
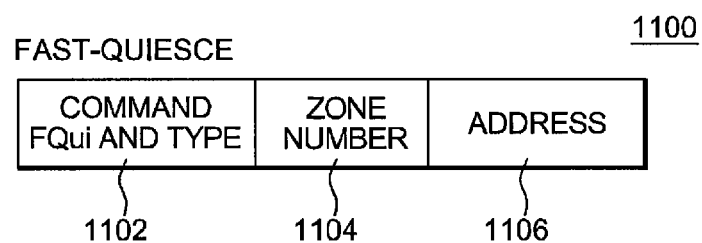
FIG. 11A depicts one example of a fast-quiesce command used in accordance with an aspect of the present invention.

Referring initially to FIG. 11A, one embodiment of a fast-quiesce (FQui) request 1100 is described. In one example, a fast-quiesce request includes:

A command field 1102 that specifies the fast quiesce command (FQui-fast quiesce) and the type of fast-quiesce request (e.g., IPTE, IDTE, etc.), which specifies the invalidation that is required by the processor;

A zone field 1104 that indicates the partition zone-number of the initiator 1104; and An address field 1106 that further qualifies the invalidation required (for example, the page index for IPTE).

Figure 11B:
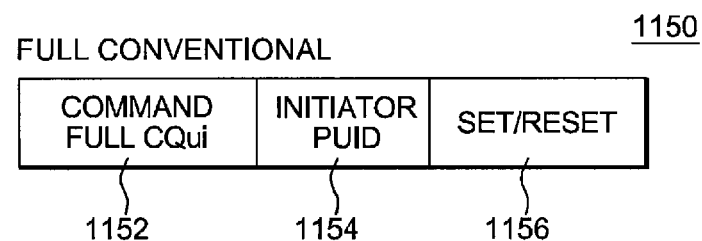
FIG. 11B depicts one example of a full conventional (or total system) quiesce command used in accordance with an aspect of the present invention.

FIG. 11B depicts one embodiment of a full conventional quiesce request 1150. In one example, a full conventional quiesce request includes:

A command field 1152 that indicates the full quiesce command;

An indication of the processor ID (PUID) of the initiating processor 1154; and

An indication of whether the command is a SET or RESET full conventional request 1156.

Figure 12:
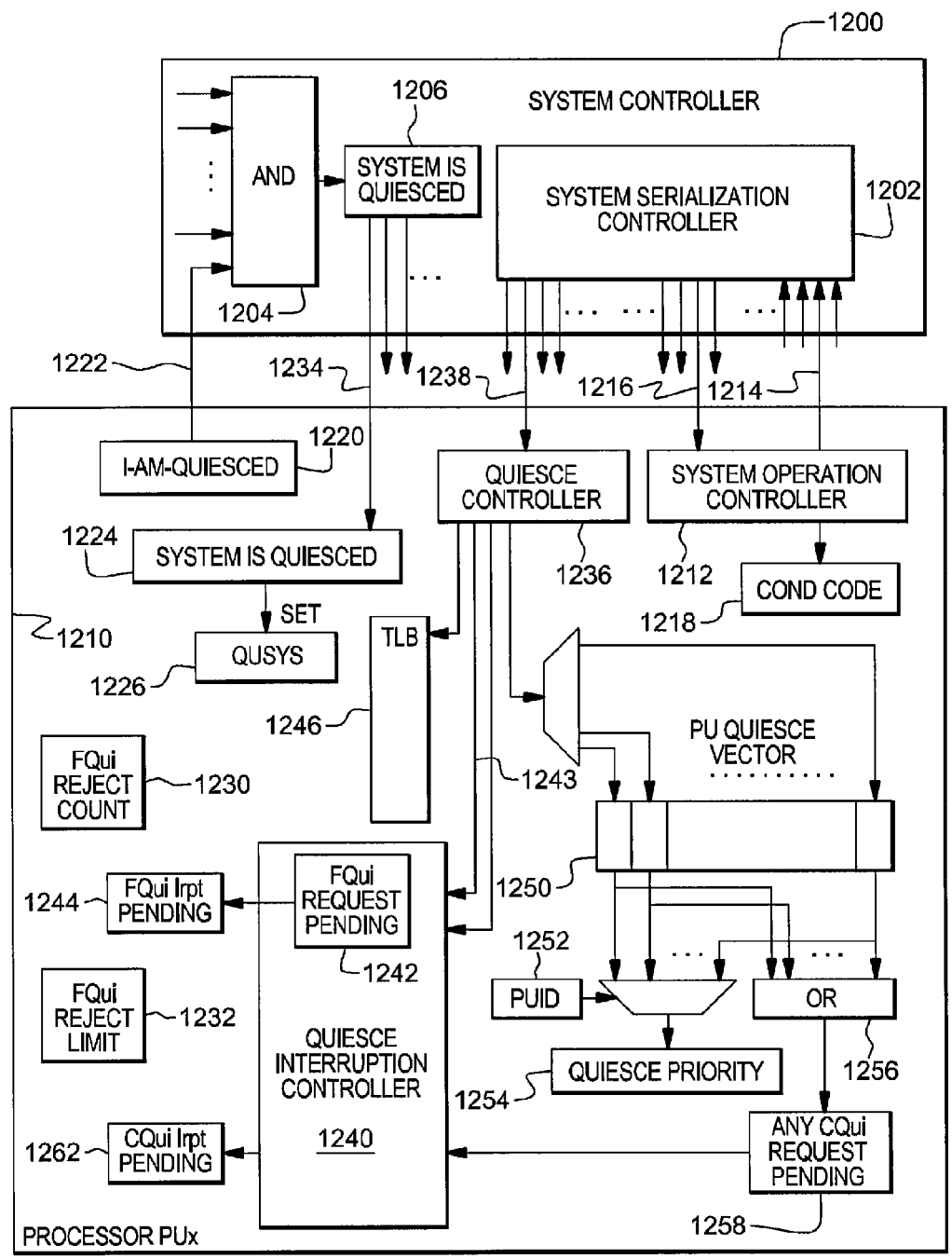
FIG. 12 depicts a more detailed embodiment of a processor and system controller of a computer system utilizing quiesce request processing, in accordance with an aspect of the present invention.

FIG. 12 depicts an example of a system controller 1200 coupled to a plurality of central processors (CPUs) 1210, only one of which is illustrated. Those skilled in the art will understand that more than one processor 1210 may be coupled to system controller 1200.

Referring to FIG. 12, system controller 1200 includes various controls including, for instance, system serialization controls 1202. The system serialization controls 1202, among other things, are used to ensure that operations that are to be serialized, such as those used by the Invalidate Page Table Entry (IPTE), Invalidate DAT Table Entry (IDTE), or Compare and Swap and Purge (CSP and CSPG) instructions, are serialized, such that only one such instruction is in progress in any one partition at any one time in the computing environment. It also monitors the sequence of events for that operation.

System controller 1200 is coupled to each central processor 1210 via various interfaces. For instance, an interface 1214 to the controller 1200 is used by the firmware in a central processor to send "control" commands from the System Operation controller 1212, which specify an action to be taken by system controller 1200 and in some cases by the system serialization controls 1202. Another interface is a response bus 1216, which is used to return status information from the controller 1200 regarding these commands. This status information is used by the System Operation controller 1212 in the central processor 1210 to set a condition code 1218 used to indicate the status of the System Operation request. The response information may be set from a plurality of sources within controller 1200, including the system serialization controls 1202. A central processor 1210 can also use this interface to sense the state of the system serialization controls 1202 in system controller 1200.

A further interface includes interface 1222, which provides the conventional quiesce state (I-AM-QUIESCED) 1220 of this local central processor 1210 to the system controller 1200. The system controller 1200 ANDs 1204 the I-AM-QUIESCED state 1220 from all the applicable processors in the system to indicate the system-is-quiesced state 1206. This system-is-quiesced state 1206 is provided across interface 1234 to each central processor 1210 where a local copy 1224 is maintained and is used to set QUSYS 1226 for inquiry by the firmware.

For quiesce operations such as IPTE, IDTE and CSP/G, when required or desired, a fast-quiesce operation is sent across the System Operation interface 1214. If the system serialization controller 1202 is busy processing another fast-quiesce request, it will indicate this "reject" to the system operation controller 1212 in the initiating central processor 1210 using the condition code 1218. Firmware in the initiating central processor maintains a count of the number of rejections for any given fast-quiesce request 1230. When this count reaches the fast-quiesce reject limit 1232, a conventional quiesce sequence is used to guarantee the fast-quiesce does eventually complete.

If the system serialization controller 1202 is not busy with another fast-quiesce operation, i.e., the command is not rejected, it will broadcast across interface 1238 the fast-quiesce "control" command to the Quiesce Controller 1236 in each central processor 1210 of the system. When the Quiesce Controller 1236 receives a fast-quiesce (FQui) request, it will determine if that central processor 1210 is to be interrupted to handle that quiesce request and if so it will indicate this 1243 to the Quiesce Interruption Controller 1240 causing a fast-quiesce request 1242 and interruption 1244 to become pending. In addition, and when appropriate, the quiesce controller 1236 will forward the fast-quiesce command to the Translation Look-aside Buffers (or TLBs) 1246 in the central processor 1210 so that it can invalidate any TLB entries required by the request.

When a conventional quiesce sequence is used, either because of multiple fast-quiesce rejections or because the fast-quiesce mechanism does not support the function requiring the quiesce, the firmware sends a full conventional quiesce "control" command across interface 1214 using the System Operation controller 1212. For either request, the System Serialization Controller 1202 forwards the SYSOP (quiesce) command, which indicates that a conventional quiesce is requested, to the Quiesce Controller 1236 in each processor. The Quiesce Controller uses the initiator's processor ID 1154 (FIG. 11B) from the SYSOP request to set the corresponding bit in the PU conventional quiesce priority vector 1250 (FIG. 12). The conventional quiesce priority vector 1250 is used, among other things, to determine if this local processor has conventional quiesce priority based on the processor ID of the local processor 1252. If the bit corresponding to the local PUID 1252 is the left-most bit that is on in the priority vector 1250 then this processor is given conventional quiesce priority 1254.

The logical OR 1256 of the bits in the quiesce priority vector 1250 is used to indicate that if there is any conventional quiesce (CQui) request pending 1258. This is provided to firmware as a branch condition. In addition, the any-conventional-quiesce-request-pending indicator 1258 is sent to the Quiesce Interruption Controller 1240. The any-conventional-quiesce-request-pending 1258 is then sent to the quiesce interruption controller and is used to indicate that a conventional quiesce interruption is pending 1262.

Further details regarding quiescing are described in the following patents/applications, each of which is hereby incorporated herein by reference in its entirety: U.S. Publication No. 2009/0216928 A1 entitled "System, Method and Computer Program Product for Providing a New Quiesce State," Heller et al, published Aug. 27, 2009; U.S. Publication No. 2009/0216929 A1 entitled "System, Method and Computer Program Product for Providing a Programmable Quiesce Filtering Register," Heller et al., published Aug. 27, 2009; U.S. Publication No. 2009/0217264 A1 entitled "Method, System and Computer Program Product for Providing Filtering of Guest2 Quiesce Requests," Heller et al., published Aug. 27, 2009; U.S. Publication No. 2009/0217269 A1 entitled "System, Method and Computer Program Product for Providing Multiple Quiesce State Machines," Heller et al., published Aug. 27, 2009; U.S. Pat. No. 6,996,698 B2 entitled "Blocked Processing Restrictions Based On Addresses," Slegel et al., issued Feb. 7, 2006; U.S. Pat. No. 7,020,761 B2 entitled "Blocking Processing Restrictions Based On Page Indices," Slegel et al., issued Mar. 28, 2006; and U.S. Pat. No. 7,530,067 B2 entitled "Filtering Processor Requests Based On Identifiers," Slegel et al., issued May 5, 2009.

Described in detail above is a serialization mechanism that facilitates processing in a multi-processing environment. This serialization mechanism enables the removal of the guest portion of the IPTE Interlock used to serialize processing. In one example, this serialization mechanism includes a DIAG instruction that guarantees that all processors in the system observe the IPTE Interlock that was previously set by the hypervisor. It also waits for completion of any pending IPTE, IDTE, CSP/G instructions. This guarantees 1) that any future IPTE, IDTE, CSP/G executed by the guest is intercepted to the host since the IPTE interlock bit is set; and 2) any previous IPTE, IDTE, or CSP/G is completed before the hypervisor begins its instruction emulation.

No hardware changes are required and only a very small change is needed by the hypervisor; the issuing of the system serialization function after setting the host IPTE interlock, to support the function. Further, no change is required for the recovery algorithm used by the hypervisor with respect to the IPTE Interlock. If the hypervisor continues to check the old guest lock, this also allows the function to be disabled by the firmware transparent to the hypervisor allowing for more flexibility in testing and the ability to measure the performance gain recognized by the new technique.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 13:
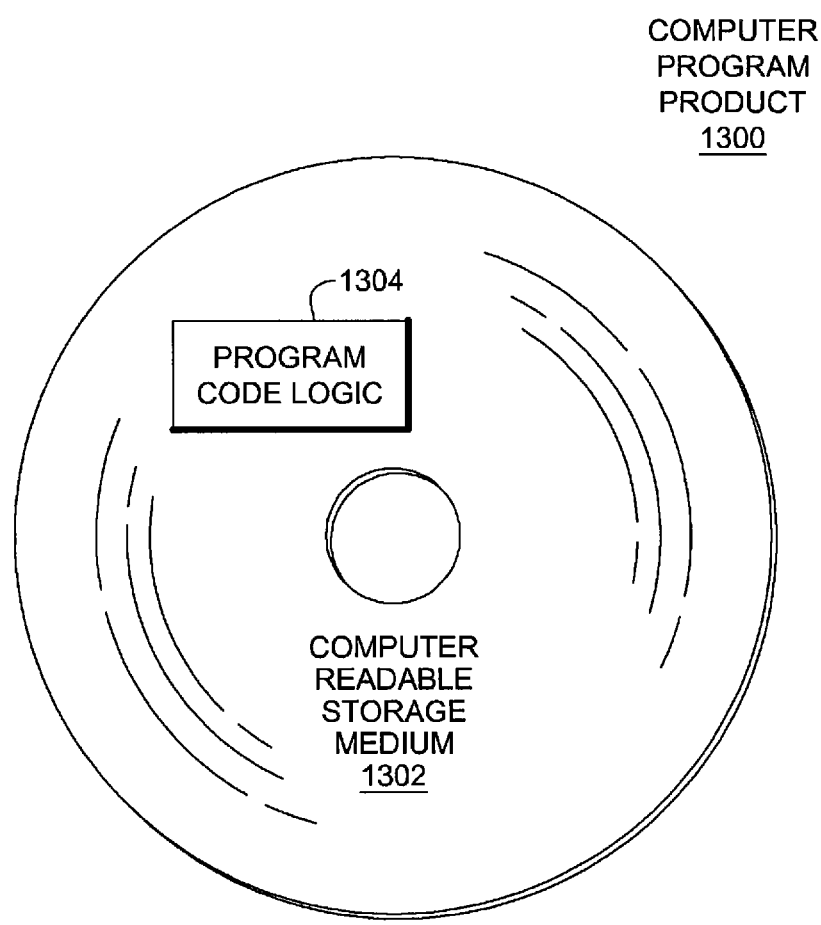
FIG. 13 depicts one embodiment of a computer program product incorporating one or more aspects of the present invention.

Referring now to FIG. 13, in one example, a computer program product 1300 includes, for instance, one or more computer readable storage media 1302 to store computer readable program code means or logic 1304 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. As examples, servers other than System z® servers, such as Power Systems servers or other servers offered by International Business Machines Corporation, or servers of other companies can include, use and/or benefit from one or more aspects of the present invention. Further, single image systems with multiple processors can incorporate and use one or more aspects of the present invention. Yet further, the serialization mechanism may be used by or with instructions other than those described herein. Additionally, the DIAG instruction may be implemented differently and/or have more, less or different fields than described herein. Yet further, serialization may be performed using a mechanism other than the DIAG instruction. Moreover, translation schemes other than DAT and ART may be used; and the data structures accessed may be other than translation tables. Further, one or more aspects of the present invention are applicable to environments other than those that include hosts and guests. For instance, the serialization mechanism can be used to serialize processing of two entities that share a common lock. One entity has an entity lock that is updated (e.g., set, reset or incremented) and the other entity does not need an entity lock due to the serialization mechanism. The entity having the entity lock is, e.g., the entity that would update the entity lock less frequently. Many possibilities exist.

Further, other types of computing environments can benefit from one or more aspects of the present invention. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 14:
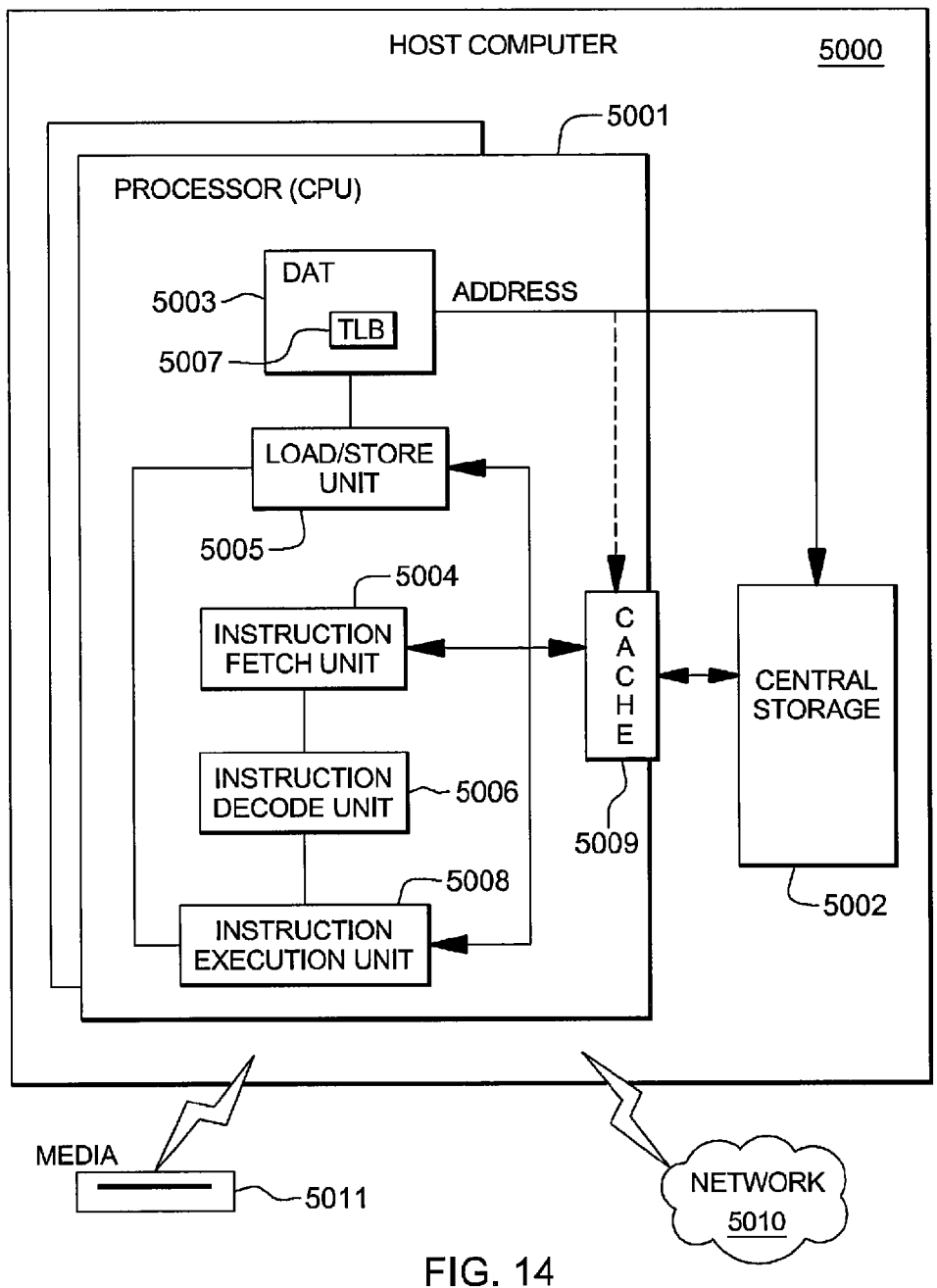
FIG. 14 depicts one embodiment of a host computer system to incorporate and use one or more aspects of the present invention.

Referring to FIG. 14, representative components of a Host Computer system 5000 to implement one or more aspects of the present invention are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture®, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture®, bits are numbered in a left-to-right sequence. In the z/Architecture®, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture®). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, the invention may be practiced by software (sometimes referred to licensed internal code, firmware, micro-code, milli-code, pico-code and the like, any of which would be consistent with the present invention). Referring to FIG. 14, software program code which embodies the present invention is typically accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 15:
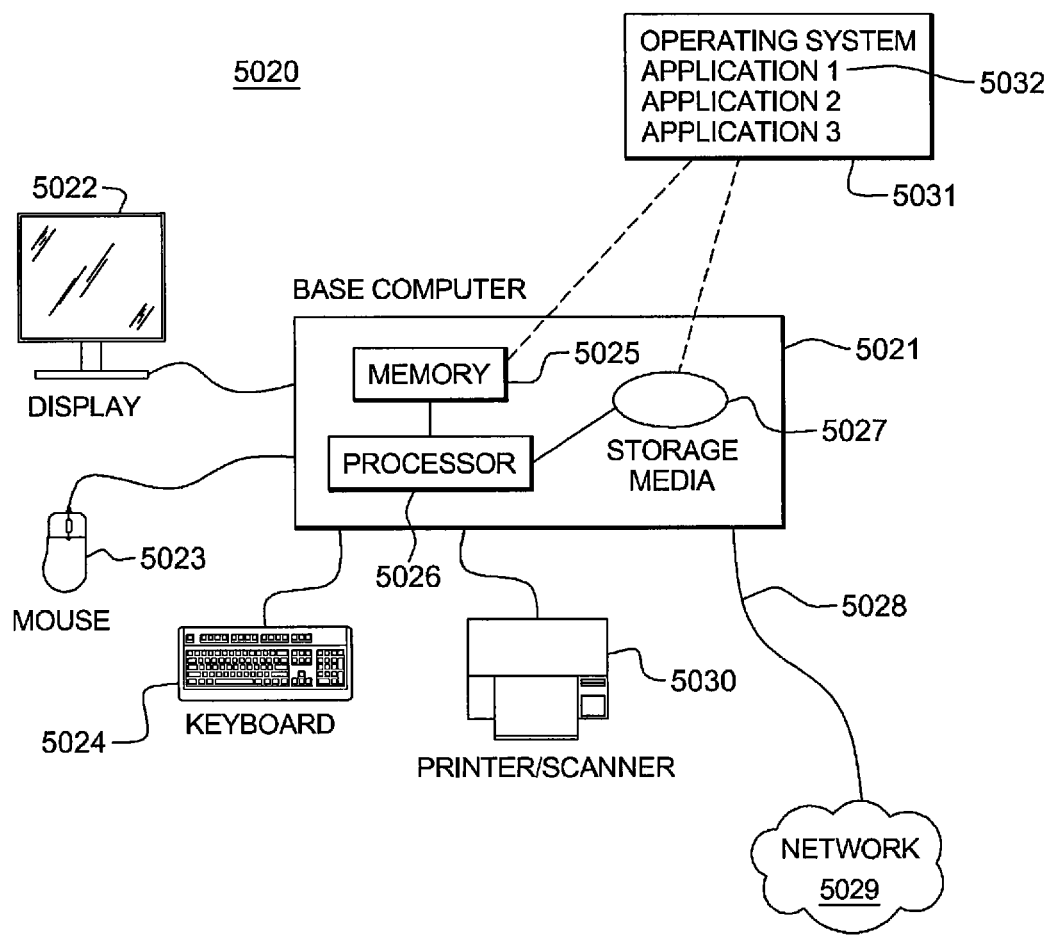
FIG. 15 depicts a further example of a computer system to incorporate and use one or more aspects of the present invention.

FIG. 15 illustrates a representative workstation or server hardware system in which the present invention may be practiced. The system 5020 of FIG. 15 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 16:
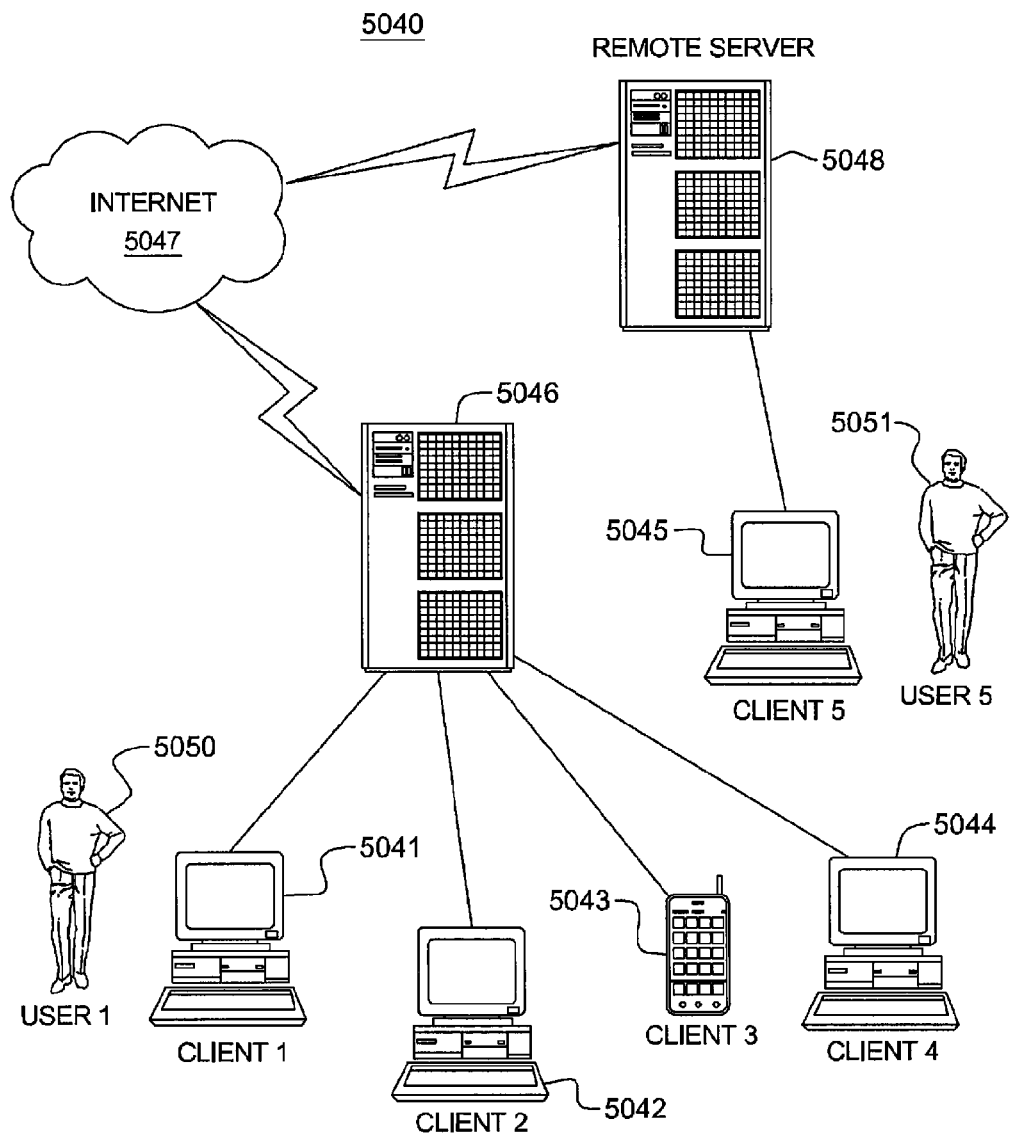
FIG. 16 depicts another example of a computer system comprising a computer network to incorporate and use one or more aspects of the present invention.

FIG. 16 illustrates a data processing network 5040 in which the present invention may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 16, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z® server available from International Business Machines Corporation.

Referring concurrently to FIG. 15 and FIG. 16, software programming code which may embody the present invention may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 17:
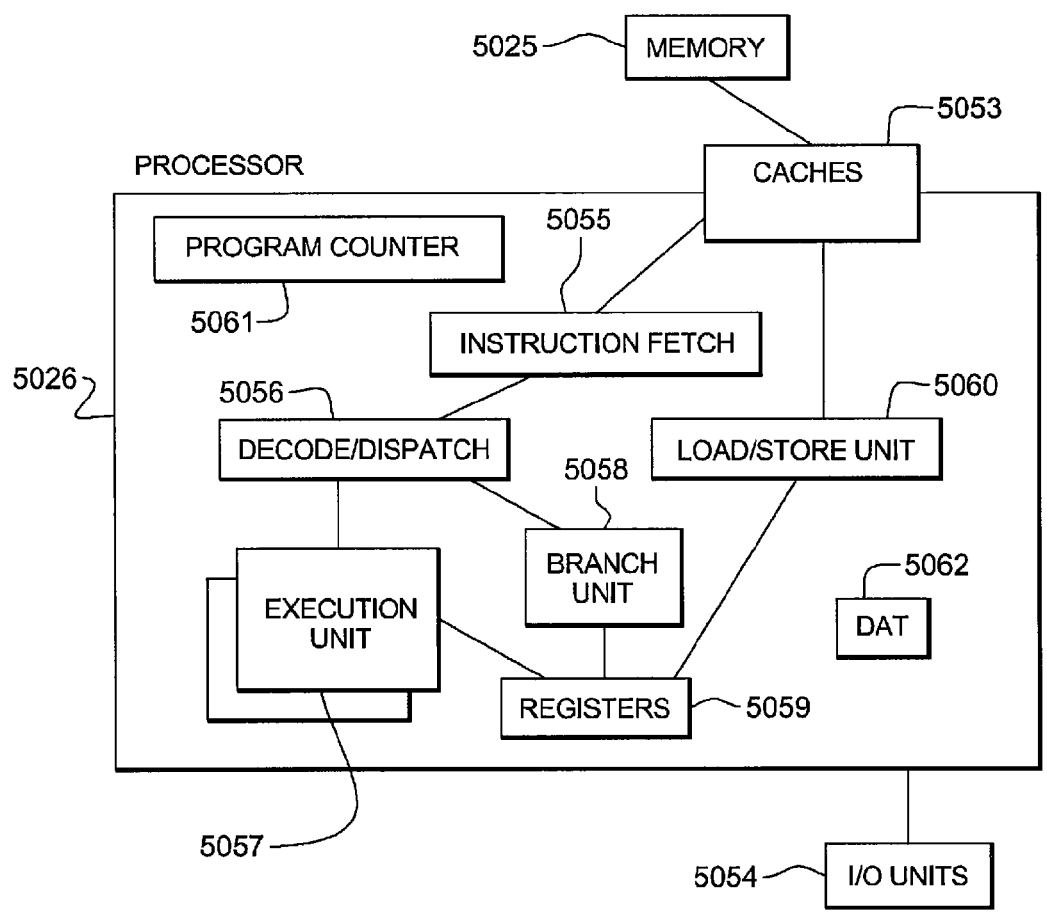
FIG. 17 depicts one embodiment of various elements of a computer system to incorporate and use one or more aspects of the present invention.

Referring to FIG. 17, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture® processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture® are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 18A:
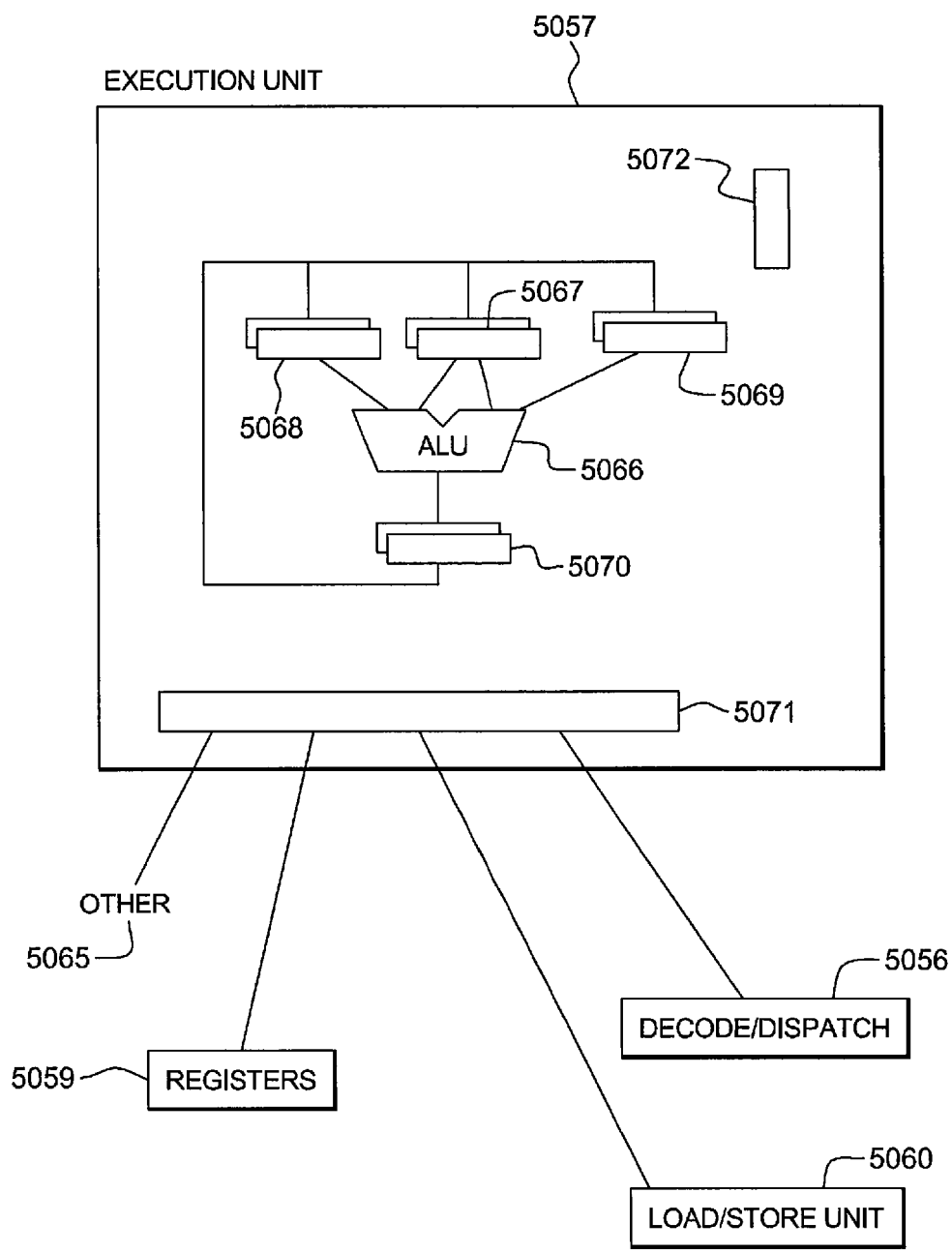
FIG. 18A depicts one embodiment of the execution unit of the computer system of FIG. 17 to incorporate and use one or more aspects of the present invention.

A processor 5026 typically has one or more units 5057, 5058, 5060 for executing the function of the instruction. Referring to FIG. 18A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture® is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 18B:
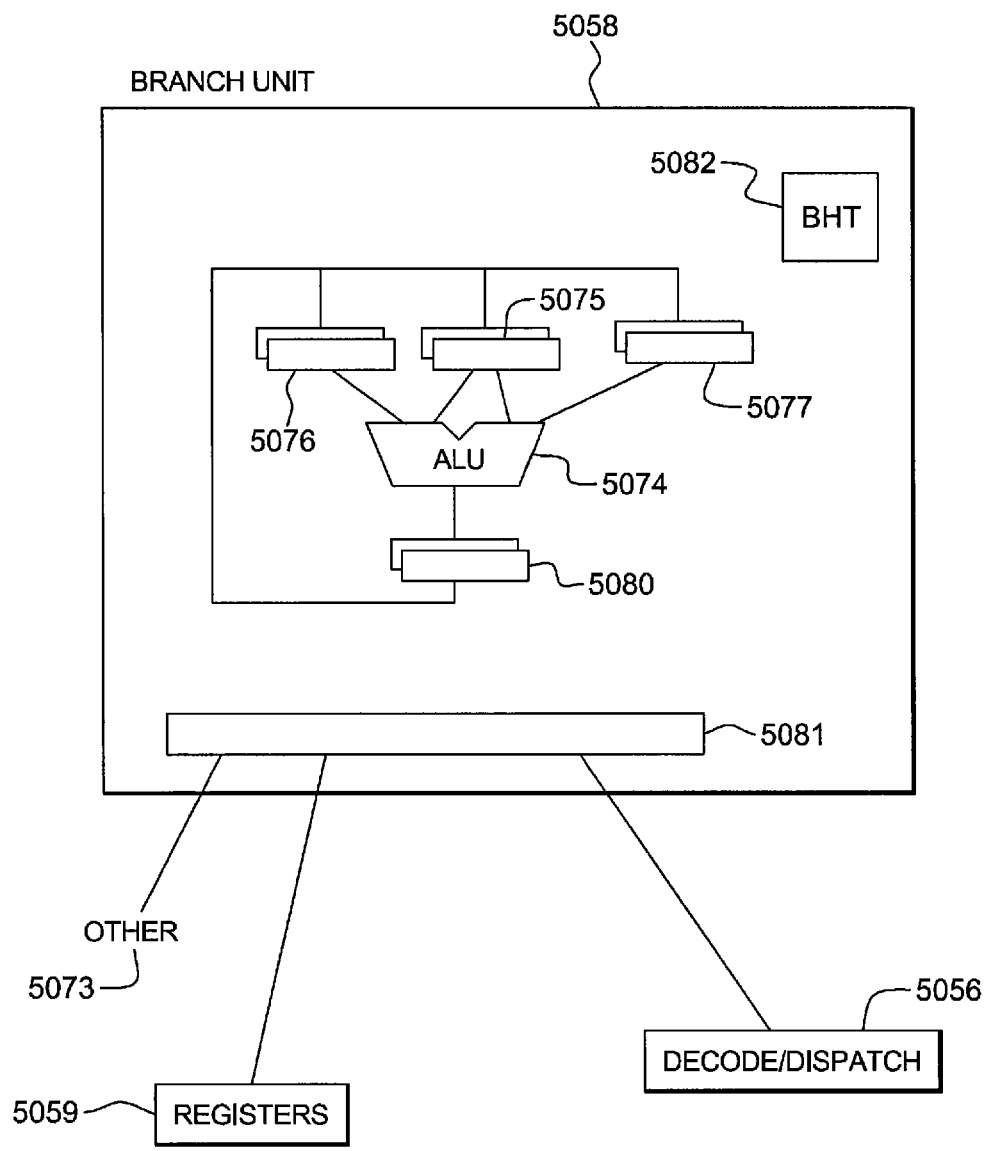
FIG. 18B depicts one embodiment of the branch unit of the computer system of FIG. 17 to incorporate and use one or more aspects of the present invention.

Referring to FIG. 18B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture® long displacement facility wherein the instruction defines a base register, an index register and an immediate field (displacement field) that are added together to provide the address of the operand in memory for example. Location herein typically implies a location in main memory (main storage) unless otherwise indicated.

Figure 18C:
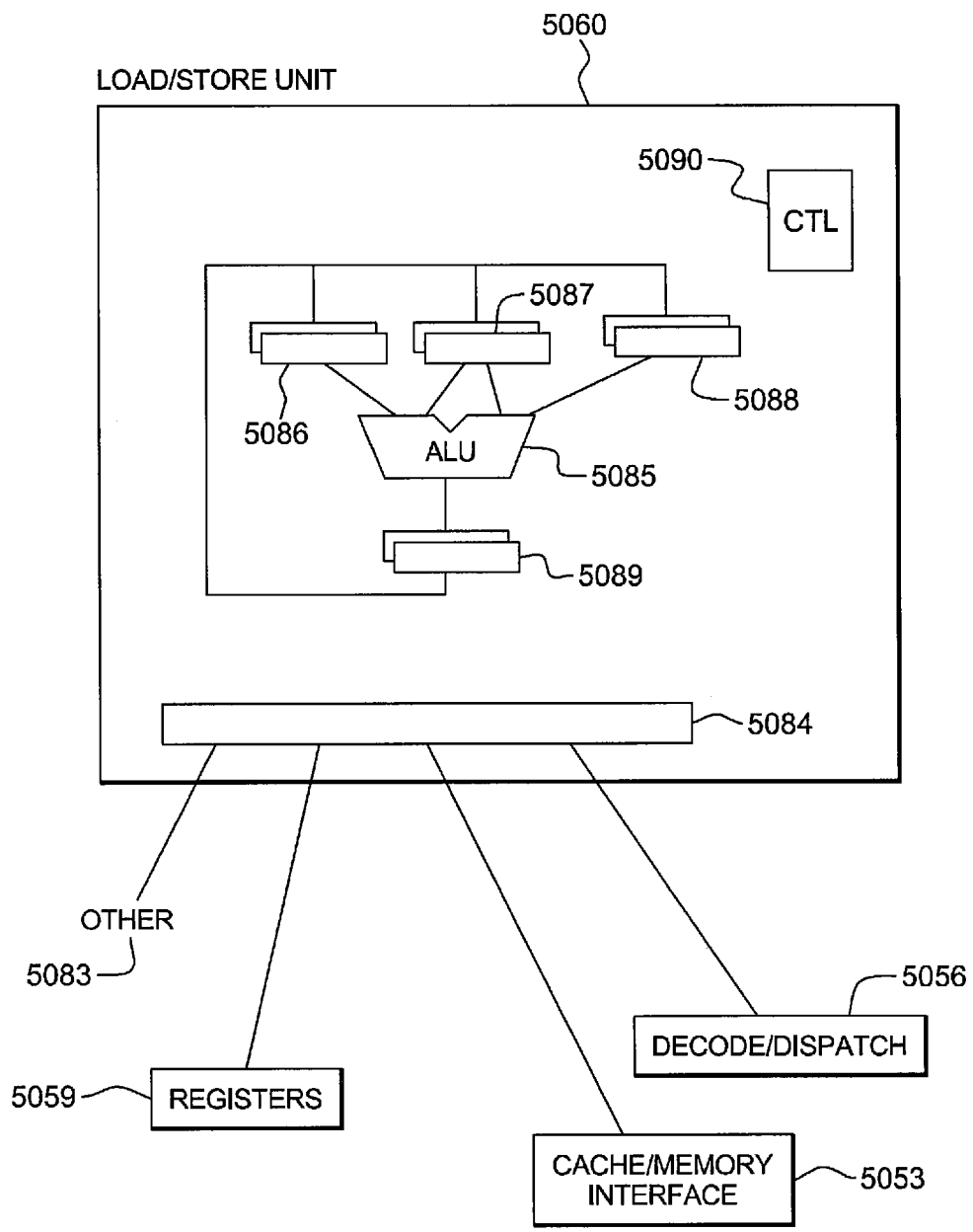
FIG. 18C depicts one embodiment of the load/store unit of the computer system of FIG. 17 to incorporate and use one or more aspects of the present invention.

Referring to FIG. 18C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture®, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 17) provide the processor with means for attaching to peripheral devices including tape, disc, printers, displays, and networks for example. I/O units are often presented to the computer program by software drivers. In mainframes, such as the System z® from IBM®, channel adapters and open system adapters are I/O units of the mainframe that provide the communications between the operating system and peripheral devices.

Further, other types of computing environments can benefit from one or more aspects of the present invention. As an example, as described above, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture® IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD™, and others. Besides execution on that hardware under a z/Architecture®, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method for executing a diagnose instruction to serialize processing of a computing environment, said method comprising:
   obtaining a machine instruction for execution, the machine instruction being defined for computer execution according to a computer architecture, the machine instruction comprising:
      an opcode field identifying a diagnose instruction;
      a subcode field identifying a first location, the contents of which include a subcode used in execution of the diagnose instruction; and
      a base field identifying a second location, the contents of which are added to the contents of a displacement field to obtain an operation code extension used to identify that the diagnose instruction is being used to serialize processing; and
   executing the machine instruction as indicated by the operation code extension, the executing comprising:
      based on the subcode being a pre-defined value:
         initiating quiescing of processors of the computing environment;
         determining the processors are quiesced; and
         based on the processors being quiesced, completing execution of the diagnose instruction.

2. The method of claim 1, further comprises setting a host lock, and responsive thereto, issuing the machine instruction.

3. The method of claim 2, wherein the execution of the machine instruction comprises making the host lock visible to processors of the computing environment.

4. The method of claim 1, further comprising:
   issuing, by a guest, a quiescing type instruction that uses a lock, the quiescing type instruction to be serialized with translation processing performed by a host for this guest;
   determining whether a host lock is set; and
   based on the host lock not being set, issuing a quiescing type instruction, absent use of a guest lock.

5. The method of claim 4, wherein based on the host lock being set, which indicates execution of the machine instruction has not completed, intercepting to the host.

6. The method of claim 1, wherein the machine instruction further comprises a control area field identifying a third location at which an address of a system call area is provided.

7. The method of claim 6, wherein based on the subcode being the pre-defined value, the address of the system call area identifying a guest for whom translation is being performed, and further comprising issuing the machine instruction based on performing translation for the guest.

8. The method of claim 7, further comprising:
   determining whether the guest is a multi-processing guest;
   based on the guest being a multi-processing guest, determining whether an interlock is set;
   based on the interlock not being set, setting the interlock and a host lock;
   based on the interlock being set, updating the host lock; and
   issuing the machine instruction based on successfully setting or updating the host lock.

9. The method of claim 8, wherein the host lock is set irrespective of a guest lock.

10. The method of claim 1, wherein completing execution of the diagnose instruction includes exiting the quiesced state.

11. The method of claim 1, further comprising:
    setting an interlock shared by a first entity and a second entity;
    based on setting the interlock, updating a first entity lock; and
    issuing the machine instruction based on successfully updating the first entity lock, wherein the machine instruction performs serialization between processing of the first entity and the second entity absent the setting of a second entity lock.

12. The method of claim 1, wherein the obtaining the machine instruction for execution comprises obtaining the machine instruction subsequent to a host lock count of a shared lock being set.

13. The method of claim 12, wherein the executing the machine instruction comprises executing the machine instruction to cause a quiesce serialization in hardware to ensure an update of the host lock count is seen across the computing environment and that any pending guest quiesce operation has completed.

* * * * *